(12) United States Patent
Tsuda

(10) Patent No.: US 10,519,882 B2
(45) Date of Patent: Dec. 31, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Satoshi Tsuda, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 85 days.

(21) Appl. No.: 15/957,231

(22) Filed: Apr. 19, 2018

(65) Prior Publication Data

US 2018/0306131 A1 Oct. 25, 2018

(30) Foreign Application Priority Data

Apr. 21, 2017 (JP) ................................. 2017-084824

(51) Int. Cl.
| | |
|---|---|
| *F02D 41/00* | (2006.01) |
| *F02D 41/40* | (2006.01) |
| *F02M 25/08* | (2006.01) |
| *F02P 5/15* | (2006.01) |
| *F02D 41/38* | (2006.01) |

(52) U.S. Cl.
CPC ..... *F02D 41/0042* (2013.01); *F02D 41/0045* (2013.01); *F02D 41/402* (2013.01); *F02M 25/08* (2013.01); *F02P 5/15* (2013.01); *F02D 2041/389* (2013.01)

(58) Field of Classification Search
CPC .......... F02D 41/0032; F02D 41/0042; F02D 19/0621; F02D 41/003; F02M 25/08
USPC ................. 123/434, 698, 699, 516, 520
See application file for complete search history.

(56) References Cited

U.S. PATENT DOCUMENTS

| | | | |
|---|---|---|---|
| 6,363,908 B1 | 4/2002 | Kerns | |
| 10,337,446 B2 * | 7/2019 | Kumagae | ............ F02D 41/3809 |
| 2005/0274353 A1 | 12/2005 | Okubo et al. | |
| 2009/0326788 A1 * | 12/2009 | Yuasa | ................. F02D 41/3809 |
| | | | 701/104 |
| 2010/0312454 A1 * | 12/2010 | Nada | ..................... F02D 41/403 |
| | | | 701/103 |

(Continued)

FOREIGN PATENT DOCUMENTS

| | | |
|---|---|---|
| JP | 2001263126 A | 9/2001 |
| JP | 2010106770 A | 5/2010 |

(Continued)

*Primary Examiner* — John Kwon
(74) *Attorney, Agent, or Firm* — Hunton Andrews Kurth LLP

(57) ABSTRACT

An internal combustion engine comprises a fuel injector, a spark plug, an evaporated fuel purge device purging evaporated fuel in the fuel tank into an intake passage, and a control device. The control device can perform spark assist control for sequentially injecting premix-forming fuel and injecting ignition assist fuel from the fuel injector, while controlling the fuel injector and spark plug so as to make an air-fuel mixture formed by the injection of ignition assist fuel burn by the spark plug by flame propagation and to make the remaining fuel burn using the heat released by the flame propagation combustion by premixed compression self-ignition, and the control device makes the injection amount of premix-forming fuel decrease without changing the injection amount of ignition assist fuel when purging evaporated fuel into the intake passage by the evaporated fuel purge device compared to when not purging it.

7 Claims, 11 Drawing Sheets

(56) References Cited

U.S. PATENT DOCUMENTS

2011/0180035 A1\* 7/2011 Durrett ................ F02B 17/005
                                                        123/295
2018/0017011 A1\* 1/2018 Kumagae .............. F02D 35/025

FOREIGN PATENT DOCUMENTS

| JP | 2011144791 A | 7/2011 |
| JP | 2013002378 A | 1/2013 |
| JP | 2014202178 A | 10/2014 |
| JP | 2016180393 A | 10/2016 |

\* cited by examiner

INTERNAL COMBUSTION ENGINE

CROSS-REFERENCE TO RELATED APPLICATION

The present application claims priority to Japanese Patent Application No. 2017-084824 filed on Apr. 21, 2017, which is incorporated herein by reference in its entirety.

TECHNICAL FIELD

The present invention relates to an internal combustion engine.

BACKGROUND ART

Known in the art is an internal combustion engine configured to sequentially inject a premix-forming fuel and inject a ignition assist fuel from a fuel injector and to burn an air-fuel mixture formed by the injection of ignition assist fuel by flame propagation by means of a spark plug and burn the remaining fuel by premixed compression self-ignition utilizing the heat and rise in pressure generated by the combustion by flame propagation (for example, PLT 1).

Further, known in the art is an evaporated fuel purge device adsorbing evaporated fuel produced in a fuel tank in a canister and purging the adsorbed evaporated fuel from the canister into an intake passage (for example, PLT 2). In particular, the internal combustion engine described in PLT 2 is configured to be able to switch between premixed compression self-ignition combustion and normal combustion, and to purge evaporated fuel into the intake passage only at the time of premixed compression self-ignition combustion. Due to this, it is considered that deterioration of the state of combustion is suppressed.

CITATION LIST

Patent Literature

PLT 1: Japanese Patent Publication No. 2013-002378 A
PLT 2: Japanese Patent Publication No. 2001-263126 A
PLT 3: Japanese Patent Publication No. 2016-180393 A
PLT 4: Japanese Patent Publication No. 2010-106770 A

SUMMARY OF INVENTION

Technical Problem

In this regard, in the internal combustion engine according to PLT 2, when purging evaporated fuel into the intake passage, the amount of fuel injection from a fuel injector is corrected so as to be decreased by that amount. Due to this, the total amount of the fuel supplied into a combustion chamber can be controlled to an optimum value corresponding to the engine load, engine speed, or other aspect of the engine operating state.

However, as described in PLT 1, in an internal combustion engine sequentially injecting a premix-forming fuel and injecting ignition assist fuel, if uniformly decreasing these premix-forming fuel and ignition assist fuel along with the purging of fuel, it is no longer possible to suitably control the self-ignition timing of the premix and, as a result, combustion of the air-fuel mixture is deteriorated and engine output is dropped.

The present invention was made in consideration of the above problem and has as its object the provision of an internal combustion engine sequentially injecting a premix-forming fuel and injecting ignition assist fuel wherein even if purge fuel is introduced, deterioration of combustion of the air-fuel mixture and a drop of engine output are suppressed.

Solution to Problem

The present invention was made so as to solve the above problem and has as its gist the following.

(1) An internal combustion engine comprising: a fuel injector directly injecting fuel into a combustion chamber; a spark plug igniting an air-fuel mixture in the combustion chamber; an evaporated fuel purge device purging evaporated fuel in a fuel tank into an intake passage of the internal combustion engine; and a control device for controlling said fuel injector, said spark plug, and said evaporated fuel purge device,
wherein said control device is configured to perform spark assist control for sequentially injecting premix-forming fuel and injecting ignition assist fuel from said fuel injector while controlling an injection amount and injection timing of said premix-forming fuel and said ignition assist fuel and ignition timing by said spark plug so as to make an air-fuel mixture formed by said injection of ignition assist fuel burn by said spark plug by flame propagation and to make the remaining fuel burn by premixed compression self-ignition by using the heat released by said flame propagation combustion, and
said control device is configured to decrease said injection amount of premix-forming fuel without changing the injection amount of ignition assist fuel when purging evaporated fuel into said intake passage by said evaporated fuel purge device, compared to when not purging it.

(2) The internal combustion engine according to above (1), wherein said control device is configured to advance the injection timing of the ignition assist fuel and the ignition timing by said spark plug, when purging evaporated fuel into said intake passage by said evaporated fuel purge device, compared to when not purging it.

(3) The internal combustion engine according to above (2), wherein said control device is configured to set the amounts of advance when advancing the injection timing of the ignition assist fuel and the ignition timing by the spark plug along with purging of said evaporated fuel, smaller when the injection timing of said premix-forming fuel is at the relatively advanced side, compared to when it is at the relatively retarded side.

(4) The internal combustion engine according to above (2), wherein said control device is configured to inject said premix-forming fuel in a plurality of times of injection and reduces the injection amounts of part of the injections among said plurality of times of injection of premix-forming fuel when purging evaporated fuel into said intake passage by said evaporated fuel purge device, compared to when not purging it.

(5) The internal combustion engine according to above (4), wherein said control device is configured to reduce the injection amount at the injection of only the most advanced side timing among said plurality of times of injection of premix-forming fuel when purging evaporated fuel into said intake passage by said evaporated fuel purge device, compared to when not purging it.

(6) The internal combustion engine according to above (4) or (5), wherein said control device is configured to set the amounts of advance when advancing the injection timing of the ignition assist fuel and the ignition timing by said spark plug along with purging of said evaporated fuel, smaller when an injection timing at part of the injections where the amount of injection is reduced along with purging of said evaporated fuel among said plurality of times of injection of premix-forming fuel is at the relatively advanced side, compared to when at the relatively retarded side.

Advantageous Effect of Invention

According to the present invention, there is provided an internal combustion engine sequentially injecting a premix-forming fuel and injecting ignition assist fuel wherein even if purge fuel is introduced, deterioration of combustion of the air-fuel mixture and a drop of engine output are suppressed.

DESCRIPTION OF EMBODIMENT

Figure 1:
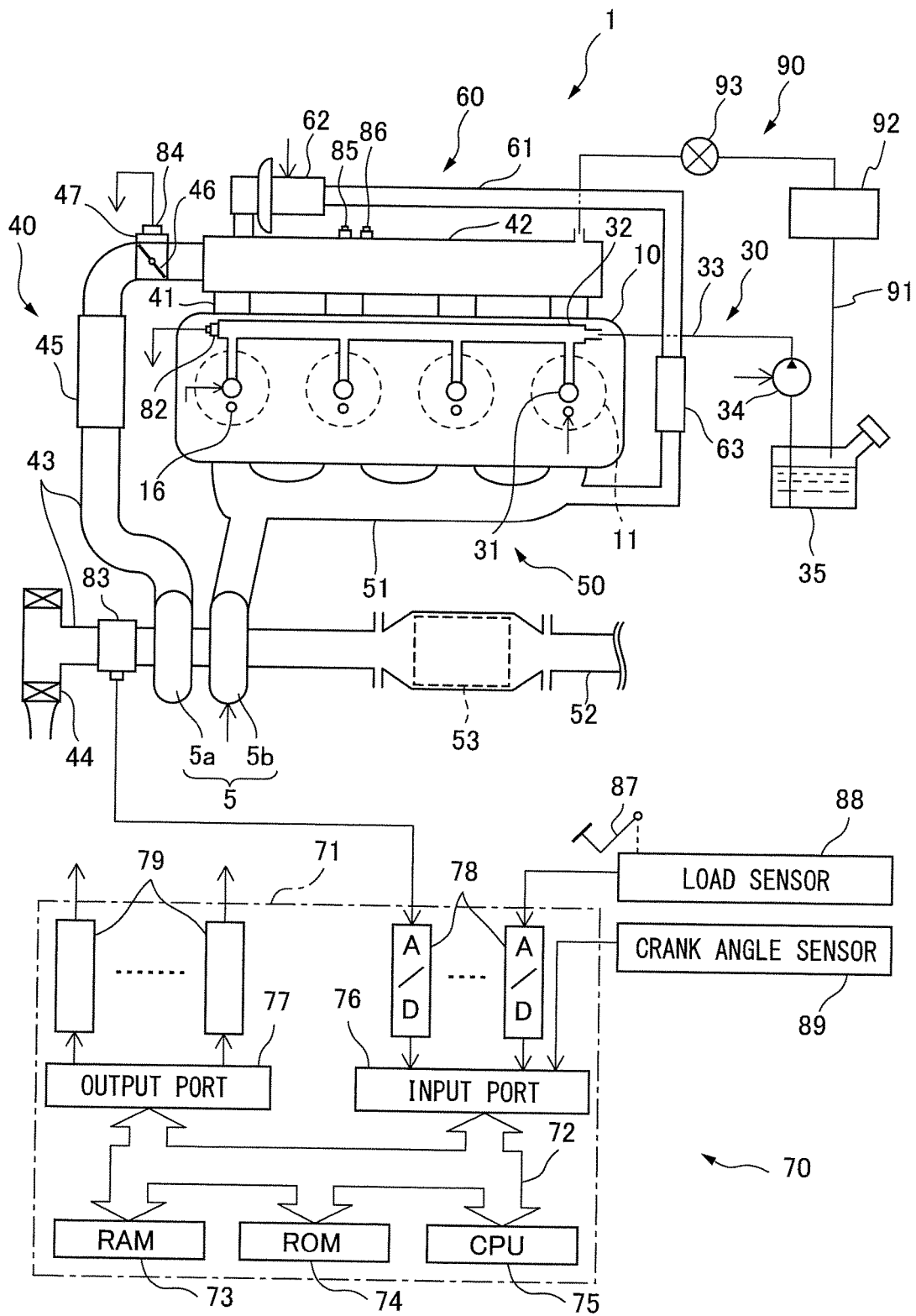
FIG. 1 is a schematic view of an internal combustion engine as a whole according to an embodiment of the present invention.

Below, referring to the drawings, embodiments of the present invention will be explained in detail. Note that, in the following explanation, similar components are assigned the same reference numerals.

First Embodiment

<<Explanation of Overall Internal Combustion Engine>>

Figure 2:
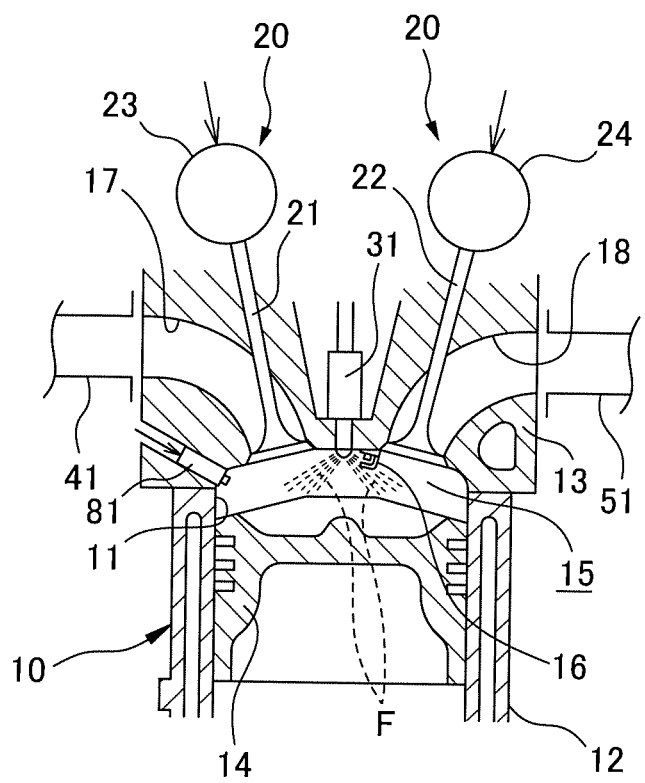
FIG. 2 is a cross-sectional view of an engine body.

First, referring to FIGS. 1 and 2, the configuration of an internal combustion engine 1 according to the first embodiment will be explained. FIG. 1 is a schematic view of the configuration of an internal combustion engine 1 fueled by gasoline. FIG. 2 is a schematic cross-sectional view of an engine body 10 of the internal combustion engine 1.

As shown in FIGS. 1 and 2, the internal combustion engine 1 comprises an engine body 10, variable valve operating mechanism 20, fuel feed system 30, intake system 40, exhaust system 50, EGR mechanism 60, evaporated fuel purge device 90, and control device 70.

The engine body 10 comprises a cylinder block 12 in which a plurality of cylinders 11 are formed, and a cylinder head 13. In each cylinder 11, a piston 14 is arranged to reciprocate in the cylinder 11. In the cylinder 11 between the piston 14 and the cylinder head 13, a combustion chamber 15 in which an air-fuel mixture is burned is formed. The cylinder head 13 comprises, near the center of each cylinder 11, a spark plug 16 for igniting the air-fuel mixture in the combustion chamber 15.

The cylinder head 13 is formed with intake ports 17 and exhaust ports 18. These intake ports 17 and exhaust ports 18 are communicated with the combustion chambers 15 of the cylinders 11. Between each combustion chamber 15 and intake port 17, an intake valve 21 is arranged. This intake valve 21 opens and closes the intake port 17. Similarly, between each combustion chamber 15 and exhaust port 18, an exhaust valve 22 is arranged. This exhaust valve 22 opens and closes the exhaust port 18.

The variable valve operating mechanism 20 comprises an intake variable valve operating mechanism 23 for driving the intake valve 21 of each cylinder to open and close, and an exhaust variable valve operating mechanism 24 for driving the exhaust valve 22 of each cylinder to open and close. The intake variable valve operating mechanism 23 can control the opening timing, closing timing, and lift amount of an intake valve 21. Similarly, the exhaust variable valve operating mechanism 24 can control the opening timing, closing timing, and lift amount of an exhaust valve 22. These variable valve operating mechanisms 23 and 24 are configured to change the opening timings, etc., by driving the intake valve 21 and exhaust valve 22 to open and close by electromagnetic actuators. Alternatively, these variable valve operating mechanisms 23 and 24 may be configured so as to change the opening timings, etc., by changing the relative phase of a camshaft with respect to a crankshaft or changing a cam profile by hydraulic pressure, etc.

The fuel feed system 30 comprises fuel injectors 31, a delivery pipe 32, fuel feed pipe 33, fuel pump 34, and fuel tank 35. Each fuel injector 31 is arranged in the cylinder head 13 so as to directly inject fuel into a combustion chamber 15 of each cylinder 11. In particular, in the present embodiment, each fuel injector 31 is arranged adjoining a spark plug 15 and near a center of a cylinder 11 so that an electrode part of the spark plug 16 is positioned in a fuel injection region F from the fuel injector 31 or its vicinity.

The fuel injectors 31 are connected through the delivery pipe 32 and fuel feed pipe 33 to the fuel tank 35. In the fuel feed pipe 33, a fuel pump 34 is arranged for pumping out fuel from inside the fuel tank 35. Fuel pumped out by the fuel pump 34 is supplied through the fuel feed pipe 33 to the delivery pipe 32 and directly injected from a fuel injector 31 into a combustion chamber 15 along with the fuel injector 31 being opened.

The intake system 40 comprises intake runners 41, a surge tank 42, intake pipe 43, air cleaner 44, compressor 5a of an exhaust turbocharger 5, intercooler 45, and throttle valve 46. The intake ports 17 of the cylinders 11 are communicated with the surge tank 42 through respectively corresponding intake runners 41. The surge tank 42 is communicated with the air cleaner 44 through the intake pipe 43. The intake pipe 43 is provided with the compressor 5a of the exhaust turbocharger 5 compressing and discharging intake air flowing through the inside of the intake pipe 43, and the intercooler 45 cooling the air compressed by the compressor 5a. The intercooler 45 is arranged at a downstream side of the compressor 5a in the direction of flow of intake air. The throttle valve 46 is arranged in the intake pipe 43 between the intercooler 45 and the surge tank 42. The throttle valve 46 can be turned by the throttle valve drive actuator 47 so as to change the opening area of the intake passage. Note that, an intake port 17, an intake runner 41, the surge tank 42, and the intake pipe 43 form an intake passage for supplying intake gas to a combustion chamber 15.

The exhaust system 50 comprises an exhaust manifold 51, exhaust pipe 52, turbine 5b of an exhaust turbocharger 5, and exhaust post-treatment device 53. The exhaust ports 18 of the cylinders 11 are communicated with the exhaust manifold 51. The exhaust manifold 51 is communicated with the exhaust pipe 52. The exhaust pipe 52 is provided with a turbine 5b of the exhaust turbocharger 5. The turbine 5b is driven to rotate by energy of the exhaust gas. The compressor 5a and turbine 5b of the exhaust turbocharger 5 are connected by a rotary shaft. If the turbine 5b is driven to rotate, along with this, the compressor 5a rotates and thereby the intake air is compressed. Further, the exhaust pipe 52 is provided with the exhaust post-treatment device 53 at a downstream side of the turbine 5b in the direction of flow of exhaust. The exhaust post-treatment device 53 is a device for cleaning the exhaust gas and then discharging it into the outer atmosphere, and comprises various types of exhaust purification catalysts for removing harmful substances or filters for trapping harmful substances, etc. Note that, an exhaust port 18, the exhaust manifold 51, and the exhaust pipe 52 form an exhaust passage discharging exhaust gas from a combustion chamber 15.

The EGR mechanism 60 comprises an EGR pipe 61, EGR control valve 62, and EGR cooler 63. The EGR pipe 61 is connected to the exhaust manifold 51 and surge tank 42, and connects them with each other. The EGR pipe 61 is provided with the EGR cooler 63 for cooling the EGR gas flowing through the inside of the EGR pipe 61. In addition, the EGR pipe 61 is provided with the EGR control valve 62 able to change the opening area of the EGR passage formed by the EGR pipe 61. By controlling the opening degree of the EGR control valve 62, the flow rate of EGR gas recirculated from the exhaust manifold 51 to the surge tank 42 is adjusted.

The evaporated fuel purge device 90 comprises an evaporated fuel pipe 91, a canister 92, and an on-off valve 93. The evaporated fuel pipe 91 is connected to the top part of the fuel tank 35 and the surge tank 42 (or the intake pipe 43 at the upstream side of the surge tank 42 in the exhaust flow direction). The evaporated fuel pipe 91 sucks in the evaporated fuel evaporated in the fuel tank 35 (fuel vapor) and releases the evaporated fuel into the surge tank 42 or the intake pipe 43 (that is, into the intake passage).

The canister 92 is used for trapping the evaporated fuel produced in the fuel tank 35. The inside of the canister 92 is packed with granular activated carbon as an adsorbent. The on-off valve 93 is a valve for opening and closing the evaporated fuel pipe 91. When the on-off valve 93 is opened, the evaporated fuel held in the canister is supplied to the surge tank 42 or the intake pipe 43, while when the on-off valve 93 is closed, the evaporated fuel is not supplied to the surge tank 42 or the intake pipe 43.

The control system 70 comprises an electronic control unit (ECU) 71 and various sensors. The ECU 71 is comprised of a digital computer comprising components connected with each other through a bidirectional bus 72, such as a RAM (random access memory) 73, ROM (read only memory) 74, CPU (microprocessor) 75, input port 76, and output port 77.

The cylinder head 13 is provided with a cylinder pressure sensor 81 for detecting a pressure in a cylinder 11 (cylinder pressure). Further, the delivery pipe 32 is provided with a fuel pressure sensor 82 for detecting a pressure of fuel in the delivery pipe 32, that is, the pressure of fuel injected from a fuel injector 31 to a cylinder 11 (injection pressure). The intake pipe 43 is provided with an air flow meter 83 for detecting a flow rate of air flowing through the inside of the intake pipe 43, at an upstream side of the compressor 5a of the exhaust turbocharger 5 in the direction of flow of intake. The throttle valve 46 is provided with a throttle opening degree sensor 84 for detecting its opening degree (throttle opening degree). In addition, the surge tank 42 is provided with an intake pressure sensor 85 for detecting the pressure of intake gas in the surge tank 42, that is, the pressure of intake gas sucked into the cylinder 11 (intake pressure). Furthermore, the surge tank 42 is provided with an intake temperature sensor 86 for detecting the temperature of the intake gas in the surge tank 42, that is, the temperature of the intake gas sucked into the cylinder 11 (intake temperature). The outputs of these cylinder pressure sensor 81, fuel pressure sensor 82, air flow meter 83, throttle opening degree sensor 84, intake pressure sensor 85, and intake temperature sensor 86 are input to the input port 76 through corresponding AD converters 78.

Further, the accelerator pedal 87 is connected to a load sensor 88 generating an output voltage proportional to an amount of depression of the accelerator pedal 87. The output voltage of the load sensor 88 is input to the input port 76 through a corresponding AD converter 78. Therefore, in the present embodiment, the amount of depression of the accelerator pedal 87 is used as the engine load. The crank angle sensor 89 generates an output pulse every time the crankshaft of the engine body 10 rotates, for example, by 15 degrees. This output pulse is input to the input port 76. In the CPU 75, the engine rotational speed is calculated from the output pulses of this crank angle sensor 89.

On the other hand, the output port 77 of the ECU 71 is connected to actuators controlling the operation of the internal combustion engine 1 through the corresponding drive circuits 79. In the example shown in FIGS. 1 and 2, the output port 77 is connected to the spark plugs 16, intake variable valve operating mechanism 23, exhaust variable valve operating mechanism 24, fuel injectors 31, fuel pump 34, throttle valve drive actuator 47, EGR control valve 62 and the on-off valve 93. The ECU 71 outputs control signals for controlling these actuators from the output port 77 to control the operation of the internal combustion engine 1.

<<Basic Combustion Control>>

Figure 3:
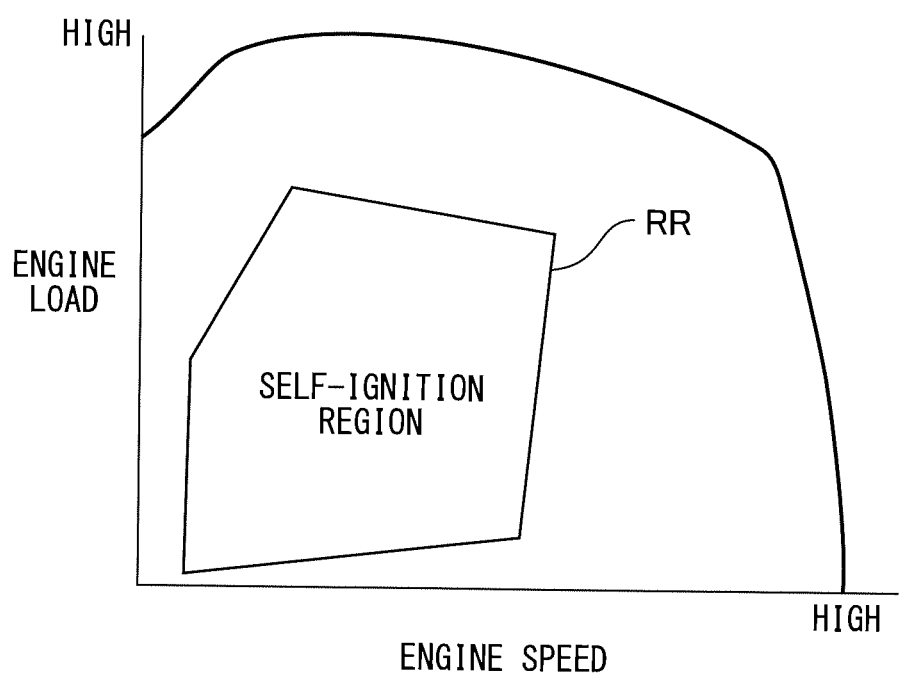
FIG. 3 is a view showing operating regions where operation is performed in different operating modes.

Next, referring to FIGS. 3 to 5, the basic combustion control by the control part of the control device 70 of the present embodiment will be explained. In the present embodiment, the control part of the control device 70 operates the internal combustion engine by the two operating modes, which are the spark ignition operating mode (hereinafter, referred to as the "SI operating mode") and the compression self-ignition operating mode (hereinafter, referred to as the "CI operating mode").

In the SI operating mode, the control part of the control device 70 basically forms a premix of the stoichiometric air-fuel ratio or near the stoichiometric air-fuel ratio in a combustion chamber 15 and ignites this premix by a spark plug 16. As a result, the premix burns in the combustion chamber 15 by flame propagation.

Further, in the CI operating mode, the control part of the control device 70 basically forms a premix of an air-fuel ratio leaner than the stoichiometric air-fuel ratio (for example, 30 to 40 or so) in a combustion chamber 15 and makes this premix burn by compression self-ignition. In particular, in the present embodiment, as the premix, the control part forms a stratified premix having a flammable layer at a center part of the combustion chamber 15 and having an air layer around the inside wall of the cylinder 11.

Combustion by premixed compression self-ignition can be performed even when the air-fuel ratio is leaner than combustion by flame propagation, and can be performed even if making the compression ratio higher. For this reason, by combustion by premixed compression self-ignition, it is possible to reduce the amount of fuel consumption and possible to raise the heat efficiency and as a result possible to improve the fuel consumption performance. Further, combustion by premixed compression self-ignition suppresses the production of $NO_X$, since the combustion temperature becomes lower compared with combustion by flame propagation. Furthermore, sufficient oxygen is present around the fuel, therefore it is possible to suppress the production of unburned HC.

Further, in combustion by premixed compression self-ignition, a reaction time is required until an air-fuel mixture self-ignites in a combustion chamber 15. If the engine speed becomes higher, it is no longer possible to secure the reaction time required for the air-fuel mixture to self-ignite, and the rise in pressure per unit time becomes too high and thus the combustion noise becomes larger. For this reason, in the region of a high engine speed, operation is performed in the SI operating mode. Further, if the engine load becomes higher and thus the torque generated by the internal combustion engine becomes larger, knocking occurs and good combustion by self-ignition is no longer possible. Further, in this case as well, the rise in pressure per unit time becomes too high and thus the combustion noise increases. For this reason, even in a region of high engine load, operation is performed in the SI operating mode. As a result, in the present embodiment, if the engine operating state based on the engine load and engine speed, is in the self-ignition operating region RR surrounded by the solid line in FIG. 3, the internal combustion engine is operated by the CI operating mode, while if it is in a region other than the self-ignition operating region RR, the internal combustion engine is operated by the SI operating mode.

Figure 4A:
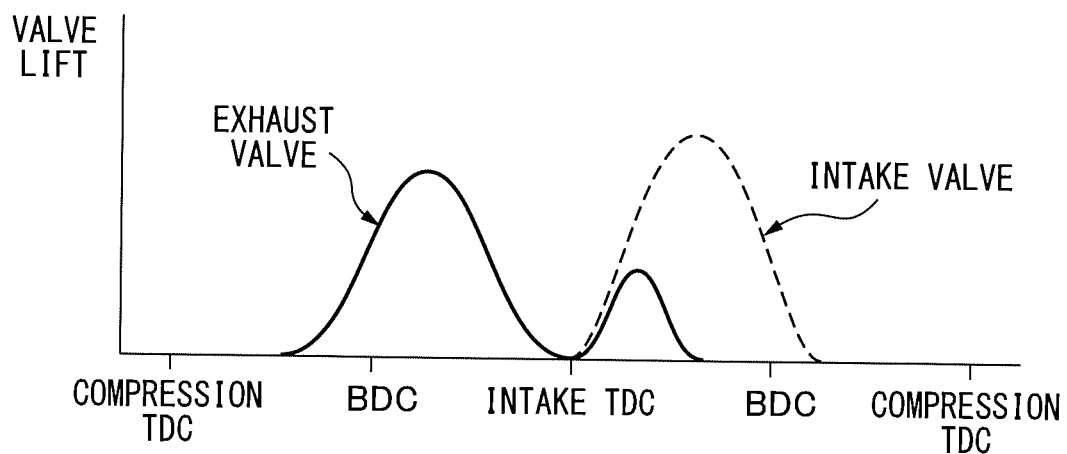
FIG. 4A is a view showing transitions in the amounts of lift of an intake valve and an exhaust valve.
Figure 4B:
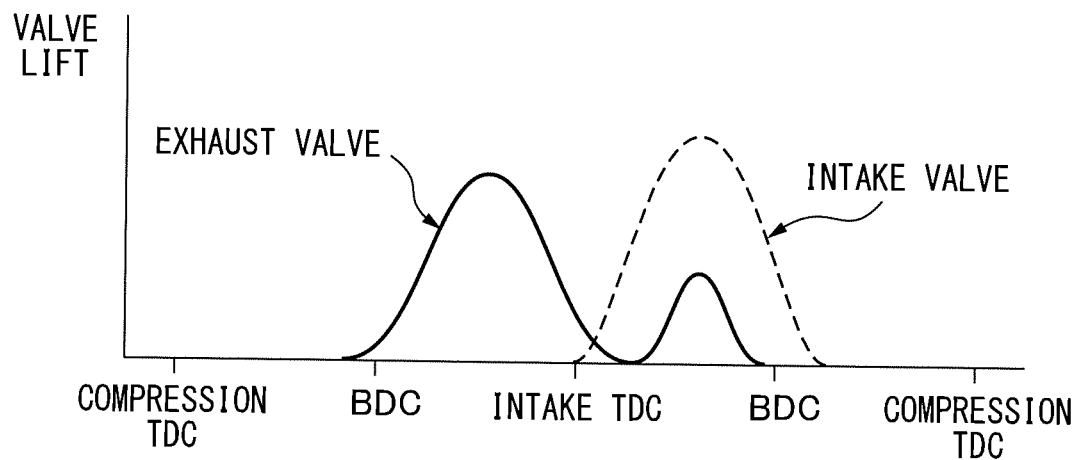
FIG. 4B is a view showing transitions in the amounts of lift of an intake valve and an exhaust valve.

Next, referring to FIGS. 4A, 4B, and 5, control of the variable valve operating mechanism 20, spark plugs 16, and fuel injectors 31 in the CI operating mode of the present embodiment will be explained In combustion by premixed compression self-ignition, it is necessary to raise the temperature in a cylinder 11 (cylinder temperature) to a temperature able to self-ignite the premix. Therefore, it is necessary to make the cylinder temperature higher than the temperature for causing the premix to burn all by flame propagation in a combustion chamber 15 such as in the middle of the SI operating mode. For this reason, in the present embodiment, for example, as shown in FIGS. 4A and 4B, during the CI operating mode, the exhaust variable valve operating mechanism 24 is controlled so that the exhaust valve 22 opens not only in the exhaust stroke, but also in the intake stroke according to need. By opening the exhaust valve 22 again during the intake stroke in this way, which is referred to as a double exhaust valve opening operation, it is possible to suck back the high temperature exhaust gas discharged from a certain cylinder during the exhaust stroke, into that cylinder, during the immediately following intake stroke. Due to this, the cylinder temperature is raised to maintain the cylinder temperature of the cylinder 11 to a temperature enabling combustion by premixed compression self-ignition.

As shown in FIG. 4A, when the amount of lift of the intake valve 21 is small, if opening the exhaust valve 22, a large amount of exhaust gas can be sucked back into its own cylinder, therefore the cylinder temperature can be greatly raised. On the other hand, as shown in FIG. 4B, if opening the exhaust valve 22 after the amount of lift of the intake valve 21 becomes larger to a certain extent, the exhaust gas is sucked back after air (fresh air) is sucked into the cylinder to a certain extent, and therefore it is possible to keep down the amount of exhaust gas sucked back into that cylinder and keep down the amount of rise of the cylinder temperature. In this way, it is possible to control the amount of rise of the cylinder temperature in accordance with the timing of performing a double exhaust valve opening operation. Note that, in performing combustion by premixed compression self-ignition, if possible to raise the cylinder temperature by a certain extent, there is not necessarily a need to perform a double exhaust valve opening operation.

In addition, in the present embodiment, in the CI operating mode, the air-fuel mixture is ignited by a spark plug 16. More specifically, when burning a premix in a combustion chamber 15 by compression self-ignition, by performing spark assist by a spark plug 16 to burn a part of the fuel by flame propagation and using the heat released by this combustion by flame propagation to forcibly make the cylinder temperature rise, the remaining fuel is burned by premixed compression self-ignition. This is referred to as combustion by spark assist self-ignition.

Figure 5:
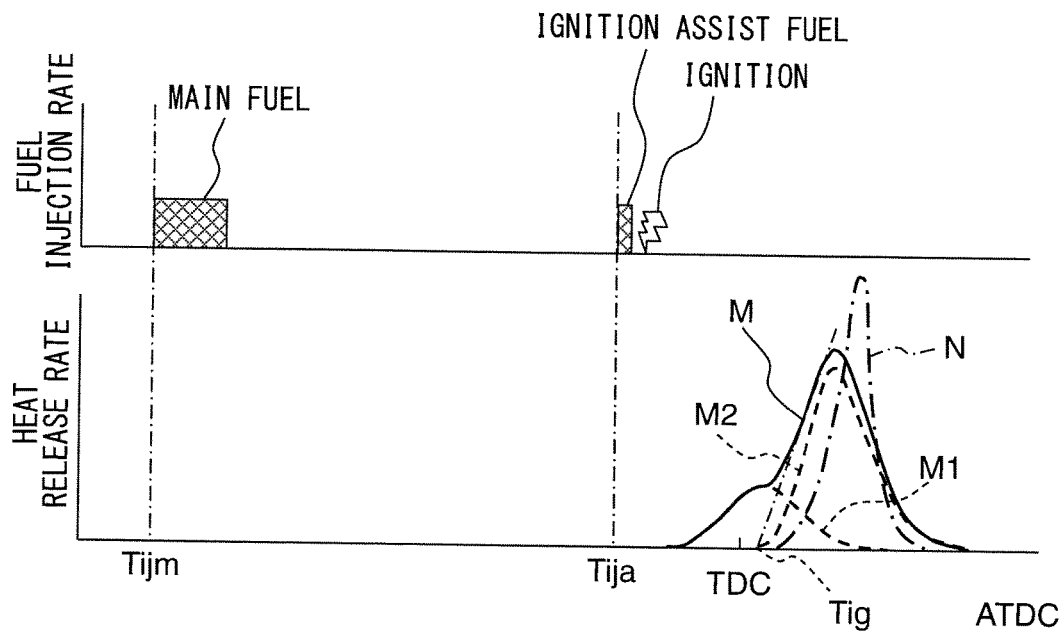
FIG. 5 is a view showing relationships between a crank angle, and fuel injection rate, ignition timing and heat release rate in the case where a premix is burned by compression self-ignition by means of ignition assist.

FIG. 5 is a view showing the relationship between a crank angle, and fuel injection rate, ignition timing and heat release rate, in the case of performing spark assist to burn a premix by compression self-ignition. The "heat release rate $(dQ/d(\ )[J/deg.CA]$" means the amount of heat per unit crank angle released by burning an air-fuel mixture, that is, an amount of heat release Q per unit crank angle. The solid line M in the figure shows the transition in the heat release rate in the case of performing spark assist to burn a premix by compression self-ignition, while the one-dot chain line N in the figure shows the transition in the heat release rate in the case of burning a premix by compression self-ignition without spark assist.

As shown in FIG. 5, in the case of performing spark assist to burn a premix by compression self-ignition, injection of main fuel by a fuel injector 31 (premix-forming fuel), injection of ignition assist fuel by a fuel injector 31, and ignition by a spark plug 16 are sequentially performed.

The main fuel is injected at any timing Tijm from the intake stroke to the middle of the compression stroke. The amount of injection of main fuel is preferably half or more of the total fuel injection amount at each cycle. Due to the injection of main fuel, a premix is formed in a combustion chamber 15. Note that, in the example shown in FIG. 5, an embodiment is shown for injecting main fuel just once in the middle of the compression stroke, but it is also possible to inject the main fuel divided into a plurality of times of injection.

The ignition assist fuel is injected at any timing Tija at the second half of the compression stroke after injecting the main fuel (for example, −10[deg.ATDC] or so). Due to injection of ignition assist fuel, a rich air-fuel mixture of an air-fuel ratio richer than the premix formed in a combustion chamber 15 due to injection of main fuel, is formed around a spark plug 16.

The ignition by a spark plug 16 is performed at any timing at the second half of the compression stroke after injecting ignition assist fuel (for example, −8[deg.ATDC] or so). Due to this, the rich air-fuel mixture (ignition assist fuel) formed around the spark plug 16 is ignited, and mainly this rich air-fuel mixture is burned by flame propagation. Heat is released such as shown by the heat release rate pattern M1 in FIG. 5 due to this combustion of the rich air-fuel mixture by flame propagation. Due to the heat released in this way, the cylinder temperature is forcibly raised. Due to this, the premix (main fuel) is self-ignited by compression. Due to this combustion of premix by compression self-ignition, heat is released as shown by the heat release rate pattern M2 in FIG. 5. As a result, in a combustion chamber 15 where combustion by flame propagation and combustion by compression self-ignition occur, the heat release rate transits as shown by the heat release rate pattern M.

Figure 6:
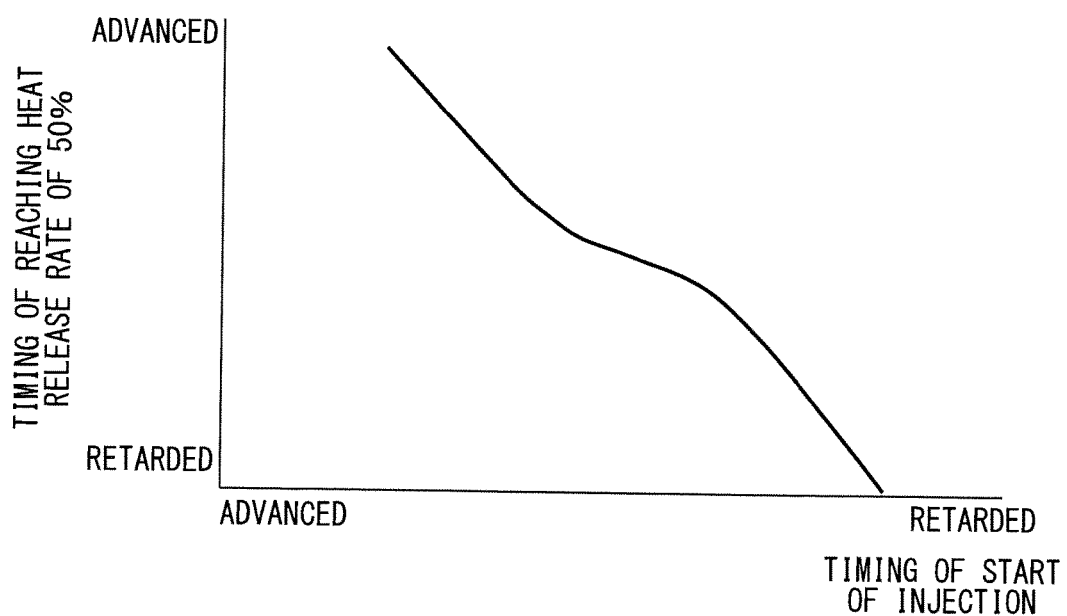
FIG. 6 is a view showing a relationship between a start timing of injection of ignition assist fuel and a timing when the amount of heat released along with combustion of air-fuel mixture reaches 50% of the total amount of heat released along with combustion.

FIG. 6 is a view showing the relationship of the timing of start of injection of ignition assist fuel (Tija in FIG. 5) and the timing when the amount of heat released along with burning of the air-fuel mixture reaches 50% of the total amount of heat released along with that burning (hereinafter, referred to as the "timing of reaching a heat release rate of 50%"). In particular, FIG. 6 shows the case of fixing the injection timing and injection amount of the main fuel and igniting the mixture by a spark plug 16 at 2[deg.CA] after start of injection of ignition assist fuel.

As will be understood from FIG. 6, the more advanced the timing of start of injection of ignition assist fuel, the more advanced the timing of reaching a heat release rate of 50%. The timing of reaching a heat release rate of 50% is believed to change according to the timing of ignition of main fuel, since the injection timing and injection amount of the main fuel are fixed. Therefore, by changing the timing of start of injection of ignition assist fuel, it is possible to change the timing of ignition of the main fuel. Therefore, by performing spark assist to burn a premix by compression self-ignition, it becomes easy to control the self-ignition timing of the premix to any timing.

Due to the above, it can be said that, in the present embodiment, the control part of the control device 70 controls the injection amount and injection timing of the main fuel and ignition assist fuel and the ignition timing, in spark assist control, so as to sequentially inject main fuel and inject ignition assist fuel from a fuel injector 31 and so as to make the air-fuel mixture formed by injection of ignition assist fuel burn by flame propagation by a spark plug 16 and make the remaining fuel burn by premixed compression self-ignition using heat released by burning by flame propagation.

Note that, when performing spark assist control like in the present embodiment, it is not possible to directly specify the self-ignition timing of the main fuel from the heat release rate. This is because when the main fuel self-ignites, heat release has already started in a combustion chamber 15 along with burning of the ignition assist fuel. Therefore, in the present embodiment, as shown in FIG. 5, the timing where the tangent of the curve of the heat release rate when the rate of rise of the heat release rate is the highest (one-dot chain line in FIG. 5) and the line of the heat release rate ( ) intersect, is calculated as the actual self-ignition timing of the main fuel.

Further, in the present embodiment, spark assist control is performed in the CI operating mode. However, spark assist control need not always be performed in the CI operating mode. For example, combustion by premixed compression self-ignition may also be performed by only injection of main fuel without spark assist in part of the region inside the self-ignition operating region RR (for example, low load region in self-ignition operating region RR). Therefore, in this case, injection of ignition assist fuel and ignition by a spark plug 16 are not performed.

<<Combustion Control in CI Operating Mode>>

Figure 7:
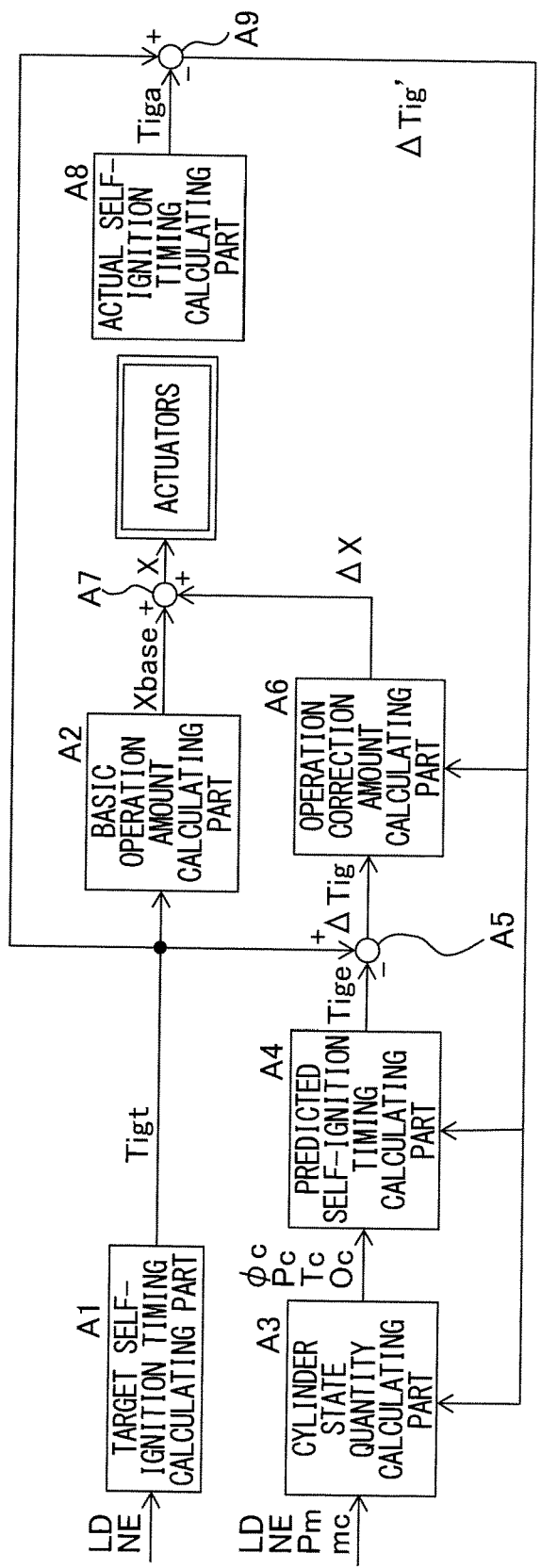
FIG. 7 is a functional block diagram in a control device.

Next, referring to FIG. 7, combustion control in the CI operating mode will be explained. FIG. 7 is a functional block diagram in the control device 70.

As shown in FIG. 7, the control device 70 comprises a target self-ignition timing calculating part A1, basic operation amount calculating part A2, cylinder state quantity calculating part A3, predicted self-ignition timing calculating part A4, target/predicted difference calculating part A5, operation correction amount calculating part A6, operation amount calculating part A7, actual self-ignition timing calculating part A8, and target/actual difference calculating part A9.

The target self-ignition timing calculating part A1 calculates the target self-ignition timing Tigt based on the engine load LD, engine speed NE, target efficiency (for example, determined by the eco mode or sports mode being selected by the driver), etc., in target self-ignition timing calculation processing. For example, the faster the engine speed NE, the earlier the timing at which the target self-ignition timing is set.

The basic operation amount calculating part A2 calculates basic operation amounts Xbase of operation parameters of actuators relating to operation of the internal combustion engine, based on the target self-ignition timing Tigt calculated by the target self-ignition timing calculating part A1, in basic operation amount calculation processing. This actuator includes the fuel injectors 31, intake valves 21, exhaust valves 22, throttle valve 46, waste gate valve (not shown) of the exhaust turbocharger 5, EGR control valve 62, etc. Further, for example, when an ozone feed device is provided for supplying ozone into a combustion chamber 15, when a water control device is provided for controlling the amount of flow of cooling water supplied to the EGR cooler 63, and/or when a fuel property changing device is provided for changing a property of the fuel injected from a fuel injector 31, the ozone feed device, water control device, and/or fuel property changing device are included in the above actuators.

The operation parameters are parameters necessary for operating these actuators. Therefore, for example, when considering a fuel injector 31 as an actuator, the injection timing Tij, injection amount Qij of each injection performed from the fuel injector 31, and the pressure of fuel injected from the fuel injector 31 (fuel pressure), etc., correspond to the operation parameters. Further, when considering an intake valve 21 or exhaust valve 22 as an actuator, an opening timing IVO and closing timing IVC of the intake valve 21 or an opening timing EVO and closing timing EVC of the exhaust valve 22, etc., correspond to the operation parameters. In addition, when considering the throttle valve 46 or EGR control valve 62 as an actuator, the opening degree Dsl of the throttle valve 46 and the opening degree Degr of the EGR control valve 62, etc., correspond to the operation parameters.

Therefore, in the basic operation amount calculating part A2, the basic injection timing Tijbase, basic injection amount Qij and basic fuel pressure from the fuel injector 31, the basic opening timing IVObase and basic closing timing IVCbase of the intake valve 21, the basic opening timing EVObase and basic closing timing EVCbase of the exhaust valve 22, the basic opening degree Dslbase of the throttle valve 46, and the basic opening degree Degrbase of the EGR control valve 62, etc., are calculated. Note that, in this Description, the basic operation amounts of these operation parameters are expressed together as "Xbase".

The basic operation amounts Xbase of the operation parameters of the actuators, for example, are calculated based on the target self-ignition timing Tigt as well as the engine load LD and engine speed NE, and using a map or calculation formula expressing the relationship among these target self-ignition timing Tigt, engine load LD, and engine speed NE and the basic operation amounts Xbase of the operation parameters. Note that, the basic operation amounts Xbase of the operation parameters may be set based on the target self-ignition timing Tigt, engine load LD, and engine speed NE and also other parameters (for example, target efficiency or temperature, etc., of the cooling water).

Note that, in the present embodiment, the basic operation amounts Xbase of the operation parameters are calculated by the basic operation amount calculating part A2, based on the target self-ignition timing Tigt. However, the target self-ignition timing calculating part A1 and the basic operation amount calculating part A2 may also be united and designed to simultaneously calculate the target self-ignition timing Tigt and basic operation amounts Xbase based on the engine load LD, the engine speed NE, etc. In this case, for example, if setting the basic operation amounts of the operation parameters of the actuators based on the engine load LD and engine speed NE, the timing when the premix will probably self-ignite when setting the operation amounts of the operation parameters to such basic operation amounts is calculated as the target self-ignition timing Tigt of the premix.

The cylinder state quantity calculating part A3 calculates the state quantities in a combustion chamber 15 (cylinder state quantities) in state quantity calculation processing. The cylinder state quantities include, for example, the equivalent ratio ϕc of the air-fuel mixture in the combustion chamber 15, the cylinder pressure Pc, the cylinder temperature Tc, the oxygen concentration Oc of the air-fuel mixture, the octane value of the fuel, etc. Further, the cylinder state quantity calculating part A3, for example, predicts and calculates the transitions in the cylinder state quantities from when the intake valve 21 is closed to when the premix is self-ignited, at the time of closing the intake valve 21 or other time before the air-fuel mixture starts to self-ignite in the combustion chamber 15.

The cylinder state quantity calculating part A3 calculates the cylinder state quantities by a numerical calculation model, based on the engine load LD, engine speed NE, etc. In calculating the cylinder state quantities by a numerical calculation model, measurement values of various types of sensors are utilized. For example, in calculating the equivalent ratio ϕc, the intake air amount measured by the air flow meter 83, the fuel injection amount calculated based on a control signal from the ECU 71 to the fuel injector 31, etc., are utilized.

The predicted self-ignition timing calculating part A4 calculates the predicted self-ignition timing Tige based on the transitions in the state quantities calculated by the cylinder state quantity calculating part A3, in predicted self-ignition timing calculation processing. The predicted self-ignition timing Tige is, for example, calculated using the following equation (1) based on the Livengood-Wu integral.

$$\int \left(\frac{1}{\tau}\right)_{P,T} dt = \int_{ts}^{\tau e} A\phi^{\alpha} P^{\beta} ON^{\gamma} \exp(\delta \cdot RES)\exp\left(-\frac{E}{RT}\right)dt \qquad (1)$$

In the above equation (1), τ is the time until the fuel injected into a combustion chamber 15 self-ignites (hereinafter, referred to as the "ignition delay time"). P indicates the cylinder pressure, T the cylinder temperature, ϕ the equivalent ratio, ON the octane value, RES the residual gas ratio (EGR rate), E the activation energy, and R a general gas constant. A, α, β, γ, and δ are respectively identification constants.

In equation (1), when integrating by time a reciprocal (1/τ) of the ignition delay time from the timing when starting fuel injection (time ts), the time until the integral from the timing of start of fuel injection becomes 1 (te–ts) is the ignition delay time τ. Therefore, when integrating by time a reciprocal (1/τ) of the ignition delay time at the cylinder pressure P and the cylinder temperature T from the target injection timing Tijt (time ts) of the main fuel, the time to where the integral becomes 1 is the predicted self-ignition timing Tige of the premix. The state quantities calculated by the cylinder state quantity calculating part A3 are entered into equation (1) to calculate the predicted self-ignition timing Tige.

The target/predicted difference calculating part A5 subtracts the predicted self-ignition timing Tige calculated by the predicted self-ignition timing calculating part A4 from the target self-ignition timing Tigt calculated by the target self-ignition timing calculating part A1 so as to calculate the target/predicted difference ΔTig, in target/predicted difference calculation processing.

The operation correction amount calculating part A6 calculates, based on the target/predicted difference ΔTig calculated by the target/predicted difference calculating part A5, the correction amounts of the operation parameters of the actuators so that the target/predicted difference ΔTig becomes zero, in correction amount calculation processing. In other words, it can be said that the operation correction amount calculating part A6 corrects the operation parameters of the actuators so that the target/predicted difference ΔTig becomes zero.

For example, when considering a fuel injector 31 as an actuator, the operation correction amount includes a correction amount ΔTij of the timing of fuel injection from a fuel injector 31, a correction amount ΔQij of the amount of fuel injection from a fuel injector 31, etc. When considering the variable valve operating mechanism 20 as an actuator, the correction amount includes the correction amount ΔIVO of the opening timing and the correction amount ΔIVC of the closing timing of the intake valve 21 and the correction amount ΔEVO of the opening timing and the correction amount ΔEVC of the closing timing of exhaust valve 22 etc. When considering the throttle valve 46 or EGR control valve 62 as an actuator, the correction amount includes the correction amount ΔDsl of the opening degree Dsl of the throttle valve 46 and the correction amount ΔDegr of the opening degree Degr of the EGR control valve 62. Note that, in this Description, these operation correction amounts are shown together by ΔX.

Note that, the actuators in which the operation amounts are corrected, are not limited to these fuel injector 31, etc., and may also include a waste gate valve and other actuators. Similarly, the operation parameters which can be corrected, are also not limited to the above-mentioned fuel injection timing Tij, etc., and may include other operation parameters.

The operation amount calculating part A7 calculates the final operation amounts X of operation parameters of the actuators, in operation amount calculation processing. Specifically, it adds the operation correction amounts ΔX calculated at the operation correction amount calculating part A6 to the basic operation amounts Xbase calculated at the basic operation amount calculating part A2 to calculate the final operation amounts X (X=Xbase+ΔX). Specifically, for example, it adds the correction amount ΔTij of the fuel injection timing calculated at the operation correction amount calculating part A6 to the basic fuel injection timing Tijbase calculated at the basic operation amount calculating part A2 to calculate the final fuel injection timing Tij (Tij=Tijbase+ΔTij). It performs similar processing on the other operation parameters. The thus calculated final operation amounts X are input as command values to the actuators. The actuators are operated so as to match the final operation amounts X.

The actual self-ignition timing calculating part A8 calculates the actual self-ignition timing of the premix (hereinafter, referred to as the "actual self-ignition timing") based on the cylinder pressure detected by the cylinder pressure sensor 81 in actual self-ignition timing calculation processing. Specifically, it calculates the transition in the heat release rate based on the output of the cylinder pressure sensor 81 detecting the cylinder pressure, after the air-fuel mixture finishes burning in a combustion chamber 15, and calculates the actual self-ignition timing of the premix based on the transition of the heat release rate. Note that, as explained above, when performing spark assist control, it is not possible to directly specify the self-ignition timing of the main fuel from the heat release rate, and therefore, for example, as explained using FIG. 5, the actual self-ignition timing is calculated based on the heat release rate when the rate of rise of the heat release rate is the highest.

The target/actual difference calculating part A9 subtracts the actual self-ignition timing Tiga calculated by the actual self-ignition timing calculating part A8 from the target self-ignition timing Tigt calculated by the target self-ignition timing calculating part A1 so as to calculate the target/actual difference ΔTig' in target/actual difference calculation processing.

The target/actual difference ΔTig' calculated at the target/actual difference calculating part A9 is input into the cylinder state quantity calculating part A3, predicted self-ignition timing calculating part A4, and operation correction amount calculating part A6. The cylinder state quantity calculating part A3 corrects the cylinder state quantity based on the target/actual difference ΔTig'. Further, the predicted self-ignition timing calculating part A4 calculates the predicted self-ignition timing Tige, in consideration of the target/actual difference ΔTig', so that the target/actual difference ΔTig' becomes smaller. In addition, the operation correction amount calculating part A6 calculates the correction amounts ΔX of the operation parameters, in consideration of the target/actual difference ΔTig', so that the target/actual difference ΔTig' becomes smaller.

<<Effect of Fuel Purge>>

In this regard, as explained above, the internal combustion engine according to the present embodiment comprises an evaporated fuel purge device 90. In the evaporated fuel purge device 90, the evaporated fuel formed in the fuel tank 35 is held in a canister 92. By opening an on-off valve 93, evaporated fuel held in the canister 92 is purged into the surge tank 42 or the intake pipe 43. The on-off valve 93 is opened and closed by the ECU 71. For example, its operation is controlled based on the engine load, etc.

Therefore, if the condition for supply of the evaporated fuel stands and the on-off valve 93 is opened in purge control, evaporated fuel is supplied into the intake passage and therefore a combustion chamber 15 is supplied with intake gas containing evaporated fuel. If purge control is performed in this way and intake gas containing evaporated fuel is supplied, if making the amount of injection from a fuel injector 31 the same as the case when purge control is not performed, excess fuel will be supplied into the combustion chamber 15. As a result, the engine output obtained by the internal combustion engine will become larger than the engine output corresponding to the engine load.

Therefore, to suppress fluctuation of the engine output accompanying purge control, it is necessary to reduce the total amount of fuel supplied from a fuel injector 31 by the amount of the evaporated fuel supplied by the purge control. By reducing the total amount of fuel supplied from a fuel injector 31 in this way, the total amount of fuel supplied into a combustion chamber 15 before and after the start of purge control will no longer change, and as a result it will be possible to suppress fluctuation of the engine output before and after the start of purge control.

As explained above, in the present embodiment, spark assist control is performed. For this reason, in each cycle, fuel is injected from a fuel injector 31 two times: by injection of main fuel and injection of ignition assist fuel. Therefore, when performing purge control, it may be considered to reduce both the amount of injection of main fuel and the amount of injection of ignition assist fuel, by the same ratio.

In this regard, as explained referring to FIG. 6, injection of ignition assist fuel is used for controlling the ignition timing of the premix. Further, if the amount of injection of ignition assist fuel decreases, the amount of heat released due to the ignition assist fuel being burned by flame propagation decreases. If in this way the amount of heat released along with combustion of ignition assist fuel falls, it becomes harder for the temperature of the premix to rise and as a result the ignition timing of the premix becomes slower. That is, if decreasing the amount of injection of ignition assist fuel, the ignition timing of the premix greatly changes.

<<Combustion Control at Time of Purging>>

Therefore, in the present embodiment, in the basic operation amount calculating part A2, when performing purge control of evaporated fuel by the evaporated fuel purge device 90, compared to when not performing purge control, the injection amount of each fuel is calculated so as to reduce only the amount of injection of main fuel without changing the amount of injection of ignition assist fuel.

Figure 8:
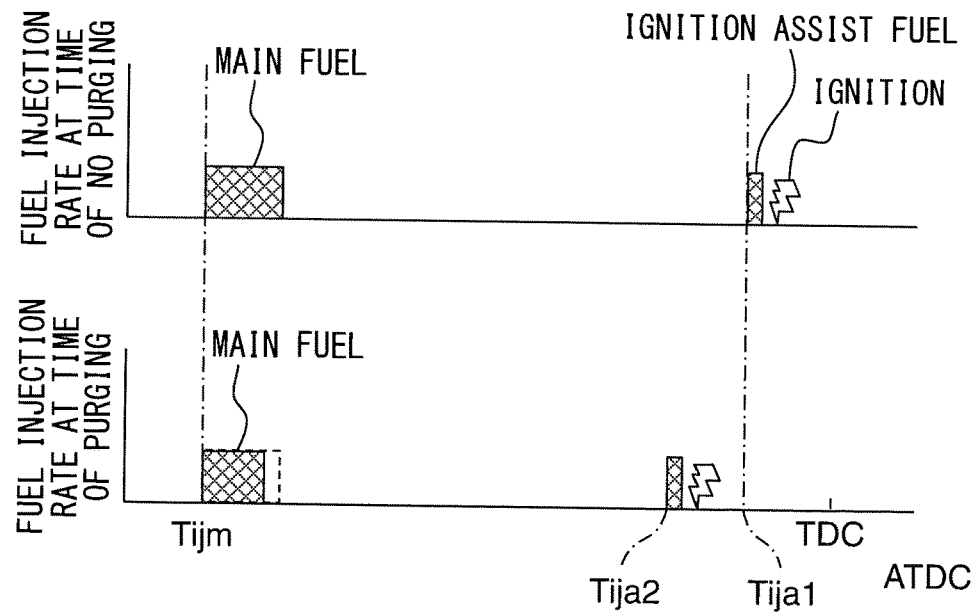
FIG. 8 is a view showing relationships between a crank angle, and fuel injection rate and ignition timing at the time of not purging and at the time of purging.

FIG. 8 is a view showing the relationship between the crank angle and fuel injection rate and ignition timing when not performing purge control(time of no purging) and when performing it (time of purging). As shown in FIG. 8, the amount of injection of main fuel when performing purge control (area of hatched part in FIG. 8 corresponding to injection amount) is smaller than the amount of injection of main fuel when not performing purge control. At this time, the amount of injection of main fuel is decreased by an amount corresponding to the amount of evaporated fuel supplied through the intake passage to a combustion chamber 15 due to purge control.

In particular, in the present embodiment, when performing purge control, the amount of evaporated fuel supplied to a combustion chamber 15 due to performing purge control, is calculated. The amount of supply of evaporated fuel is, for example, calculated based on a negative pressure in the intake passage, etc., when the on-off valve 93 is open. That is, as the negative pressure in the intake passage when the on-off valve 93 is opened becomes higher, the amount of flow of the gas supplied through the evaporated fuel pipe 91 to the intake passage becomes greater and accordingly the amount of supply of evaporated fuel becomes greater. In the present embodiment, the thus calculated amount of evaporated fuel is input to the basic operation amount calculating part A2 and, at the basic operation amount calculating part A2, the amount of injection of main fuel is calculated so that the amount of injection of main fuel is decreased by an amount corresponding to the input amount of evaporated fuel.

Note that, the amount of evaporated fuel may be calculated based on not only the negative pressure in the intake passage, but also parameters other than the negative pressure in the intake passage. Further, in the above embodiment, the amount of evaporated fuel is calculated based on the negative pressure in the intake passage, etc., and the amount of injection of main fuel is decreased based on the calculated amount of evaporated fuel. However, it is also possible to calculate the amount of decrease of the amount of injection of main fuel, directly based on the negative pressure in the intake passage, etc.

Further, in the present embodiment, the injection timing of the main fuel when performing purge control and the injection timing of the main fuel when not performing purge control are the same timing. In addition, as shown in FIG. 8, in the present embodiment, the amount of injection of ignition assist fuel when performing purge control is maintained the same as the amount of injection of ignition assist fuel when not performing purge control, therefore the these amounts are equal to each other.

According to the present embodiment, the total amounts of fuel supplied to a combustion chamber 15 when performing purge control and when not performing it, are equal to each other, and therefore it is possible to keep the engine output from fluctuating along with the start and end of the purge control.

Further, according to the present embodiment, the amounts of injection of ignition assist fuel when performing purge control and when not performing it, are equal to each other, and therefore the total amounts of heat released along with combustion of the ignition assist fuel when performing purge control and when not performing it, are equal to each other. As a result, the temperature in a combustion chamber 15 rises after injecting ignition assist fuel and igniting it by a spark plug 16, similarly when performing purge control and when not performing it. Therefore, according to the present embodiment, the timing when the premix formed by the main fuel self-ignites, can be kept from deviating between when performing purge control and when not performing it.

In addition, in the present embodiment, to calculate the injection timing of the fuel at the basic operation amount calculating part A2, when performing purge control of the evaporated fuel by the evaporated fuel purge device 90, compared with when not performing purge control, the injection timing of the ignition assist fuel and ignition timing due to the spark plug 16 are advanced.

As shown in FIG. 8, in the present embodiment, when not performing purge control, the ignition assist fuel is injected at a first injection timing Tija1 near compression top dead center (TDC). On the other hand, when performing purge control, the ignition assist fuel is injected at a second injection timing Tija2 at the advanced side from the first injection timing Tija1.

In addition, as shown in FIG. 8, in the present embodiment, when not performing purge control, the air-fuel mixture is ignited by a spark plug 16 right after the first injection timing Tija1 (for example, after 2[deg.CA]). Similarly, when performing purge control, the air-fuel mixture is ignited by the spark plug 16 right after the second injection timing Tija2 (for example, after 2[deg.CA]). Therefore, the ignition timing due to the spark plug 16 is also advanced more when performing purge control, compared with when not performing it.

Further, in the present embodiment, at the basic operation amount calculating part A2, when performing purge control, the amounts of advance are calculated so that as the amount of evaporated fuel supplied into a combustion chamber 15 by purge control becomes greater, the injection timing of the ignition assist fuel Tija and ignition timing due to a spark plug 16 are advanced greater. As explained above, the amount of supply of evaporated fuel is calculated based on the negative pressure in the intake passage, etc., when, for example, the on-off valve 93 is opened.

Note that, in the above embodiment, the amount of evaporated fuel is calculated based on the negative pressure in the intake passage, etc., and amounts of advance of the injection timing of the ignition assist fuel Tija and ignition timing due to a spark plug 16 are calculated based on the calculated amount of evaporated fuel. However, it is also possible to calculate the amounts of advance of the injection timing of the ignition assist fuel Tija and ignition timing due to a spark plug 16, directly based on the negative pressure in the intake passage, etc.

In this regard, the reason for advancing the injection timing of the ignition assist fuel and ignition timing due to a spark plug 16 when performing purge control will be explained. The vapor produced from gasoline fuel (evaporated fuel) contains a large amount of low boiling point ingredients. In particular, near ordinary temperature, the vapor produced from gasoline fuel contains propane, butane, and pentane. These propane and butane are higher in octane value than gasoline and therefore are much harder to self-ignite. In other words, the evaporated fuel supplied through the evaporated fuel purge device 90 to a combustion chamber 15 is harder to self-ignite than fuel supplied to a combustion chamber 15 by a fuel injector 31. Therefore, a premix comprised of the evaporated fuel supplied by the purge control and the fuel supplied by a fuel injector 31 is harder to self-ignite than a premix comprised of only the fuel supplied from a fuel injector 31. As a result, when purge control is being performed, as explained above, even if decreasing the amount of injection of main fuel to maintain the total amount of fuel supplied to a combustion chamber 15 at the same extent as the time of no purging, the self-ignition timing of the premix is delayed. If in this way the self-ignition timing is delayed from the optimum timing, for example, the engine output is dropped.

On the other hand, in the present embodiment, when performing purge control, the injection timing of the ignition assist fuel and ignition timing due to a spark plug 16 are advanced. In particular, in the present embodiment, as the amount (ratio) of evaporated fuel supplied into a combustion chamber 15 due to purge control becomes greater, the injection timing of the ignition assist fuel and ignition timing due to the spark plug 16 are advanced greater. In this regard, if the amount of change from main fuel to evaporated fuel is great, the premix is harder to self-ignite by that amount and accordingly the self-ignition timing of the premix is retarded. Therefore, like in the present embodiment, by increasing the amount of advance greater as the amount of supply of evaporated fuel becomes greater, the injection timing of the ignition assist fuel and ignition timing due to the spark plug 16 can be advanced by the time period corresponding to the delay caused in the self-ignition timing of the premix due to part of the main fuel being changed to evaporated fuel by performing purge control. Due to this, it is possible to suppress delay of the self-ignition timing of the premix accompanying increase of the evaporated fuel.

Next, referring to FIG. 9, correction of the predicted self-ignition timing when performing purge control will be explained. As explained above, in the present embodiment, when performing purge control, evaporated fuel is supplied to a combustion chamber 15 and the amount of injection of main fuel is decreased by a corresponding amount. Further, since the octane value of the evaporated fuel is high, when performing such control, a premix becomes harder to self-ignite. That is, it can be said that as the amount of evaporated fuel supplied into the combustion chamber 15 due to purge control becomes greater, the predicted self-ignition timing becomes more delayed. Therefore, in the present embodiment, the predicted self-ignition timing is corrected in accordance with the amount of evaporated fuel supplied into the combustion chamber 15.

Figure 9:
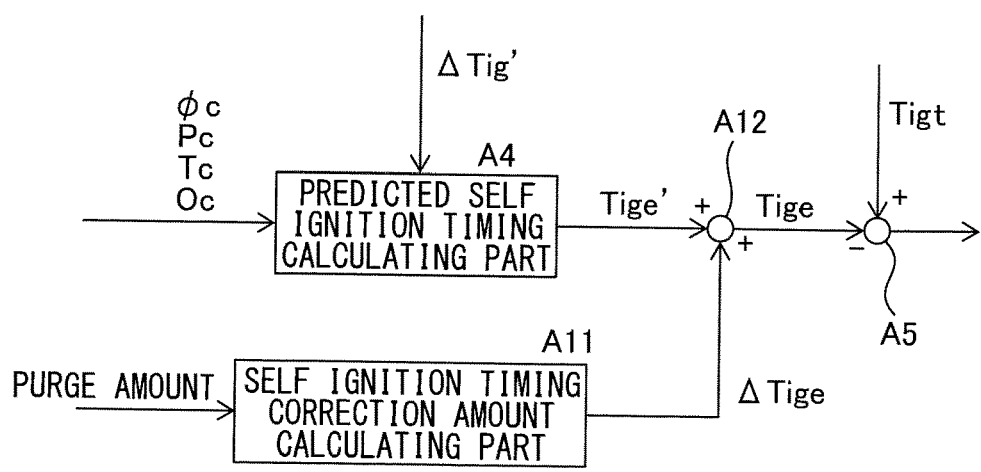
FIG. 9 is a partial functional block diagram of a control device.

FIG. 9 is a partial functional block diagram of the control device 70. As shown in FIG. 9, the control device 70 comprises a predicted self-ignition timing calculating part A4 and a target/predicted difference calculating part A5. In addition, in the present embodiment, it is provided with a self-ignition timing correction amount calculating part A11 and a self-ignition timing purge correction part A12.

In the present embodiment, the predicted self-ignition timing calculating part A4 calculates the basic predicted self-ignition timing Tige' based on the transitions in the state quantities calculated by the cylinder state quantity calculating part A3. Further, the target/predicted difference calculating part A5 subtracts the predicted self-ignition timing Tige from the target self-ignition timing Tigt calculated by the target self-ignition timing calculating part A1 so as to calculate the target/predicted difference ΔTig.

The self-ignition timing correction amount calculating part A11 calculates the correction amount ΔTige of the predicted self-ignition timing, based on the amount of evaporated fuel (purge amount) supplied into a combustion chamber 15 due to purge control, in predicted self-ignition timing correction amount calculation processing. Specifically, the correction amount ΔTige is calculated so that the larger the amount of evaporated fuel supplied by the purge control into the combustion chamber 15, the larger the correction amount ΔTige of the predicted self-ignition timing becomes. Note that, as explained above, the amount of evaporated fuel supplied into the combustion chamber 15 due to purge control is, for example, calculated based on the negative pressure in the intake passage.

The correction amount ΔTige of the predicted self-ignition timing calculated in the self-ignition timing correction amount calculating part A11 is input to the self-ignition timing purge correction part A12. The self-ignition timing purge correction part A12 adds the correction amount ΔTige' of the predicted self-ignition timing calculated by the self-ignition timing correction amount calculating part A11 to the basic predicted self-ignition timing Tige' calculated by the predicted self-ignition timing calculating part A4, to calculate the predicted self-ignition timing Tige.

In the present embodiment, the predicted self-ignition timing is corrected based on the amount of evaporated fuel supplied into a combustion chamber 15 by purge control, and therefore it is possible to calculate the predicted self-ignition timing relatively accurately.

Note that, in the above embodiment, the predicted self-ignition timing when performing purge control is calculated using the correction amount ΔTige of the predicted self-ignition timing calculated based on the amount of evaporated fuel supplied into a combustion chamber 15 by purge control. However, the predicted self-ignition timing when performing purge control does not necessarily have to be calculated using the above-mentioned technique. It may be calculated by another method as well.

Another method may include, for example, changing the method of calculation in the cylinder state quantity calculating part A3 and predicted self-ignition timing calculating part A4 when performing purge control. Specifically, the cylinder state quantity calculating part A3 calculates the equivalent ratio and the octane value so that the equivalent ratio and the octane value differ in accordance with the presence or absence of purge control.

In this regard, when performing purge control, the intake gas already contains fuel (evaporated fuel) at the point of time when intake gas is introduced into a combustion chamber 15, while the amount of fuel injected from a fuel injector 31 is decreased compared to when not performing purge control. Therefore, when performing purge control and when not performing it, the transition in equivalent ratio in the air-fuel mixture in the combustion chamber 15 changes. Therefore, the cylinder state quantity calculating part A3 calculates the equivalent ratio so that the transition in equivalent ratio differs between when performing purge control and when not performing it.

Further, as explained above, the octane value of the evaporated fuel supplied to a combustion chamber 15 by purge control is higher than the octane value of the fuel supplied from a fuel injector 31. Therefore, when performing purge control, compared to when not performing purge control, the octane value of the fuel supplied into the combustion chamber 15 becomes higher. Therefore, the cylinder state quantity calculating part A3 calculates the octane value so that the calculated octane value is higher when purge control is being performed, compared to when purge control is not being performed.

In this way, the equivalent ratio and the octane value calculated by the cylinder state quantity calculating part A3 differs between when performing purge control and when not performing purge control. As a result, when using the above formula (1) to calculate the predicted self-ignition timing at the predicted self-ignition timing calculating part A4, the values entered into the equivalent ratio $\phi$ and the octane value ON of formula (1) change. Due to this, even when purge control is being performed, it is possible to suitably calculate the predicted self-ignition timing of the premix.

Further, in the predicted self-ignition timing calculating part A4, when not performing purge control, the reciprocal is integrated by time from the target injection timing of the main fuel. However, when performing purge control, evaporated fuel is supplied into a combustion chamber 15 together with the intake gas, and therefore fuel is supplied into the combustion chamber 15 before the start of injection of main fuel. Therefore, the predicted self-ignition timing calculating part A4 starts the time integration at the time earlier than the target injection timing of the main fuel, when performing purge control. For example, if the injection timing of the main fuel is on or after the closing timing of the intake valve 21, when performing purge control, the time integration of formula (1) is started from the closing timing of the intake valve 21 (the time is of the formula (1) is set to the closing timing of the intake valve 21). By changing the integrated time of formula (1) in this way when purge control is being performed, compared to when it is not being performed, the predicted self-ignition timing of the premix can be suitably calculated even when purge control is being performed.

<<Explanation of Flow Chart>>

Figure 10:
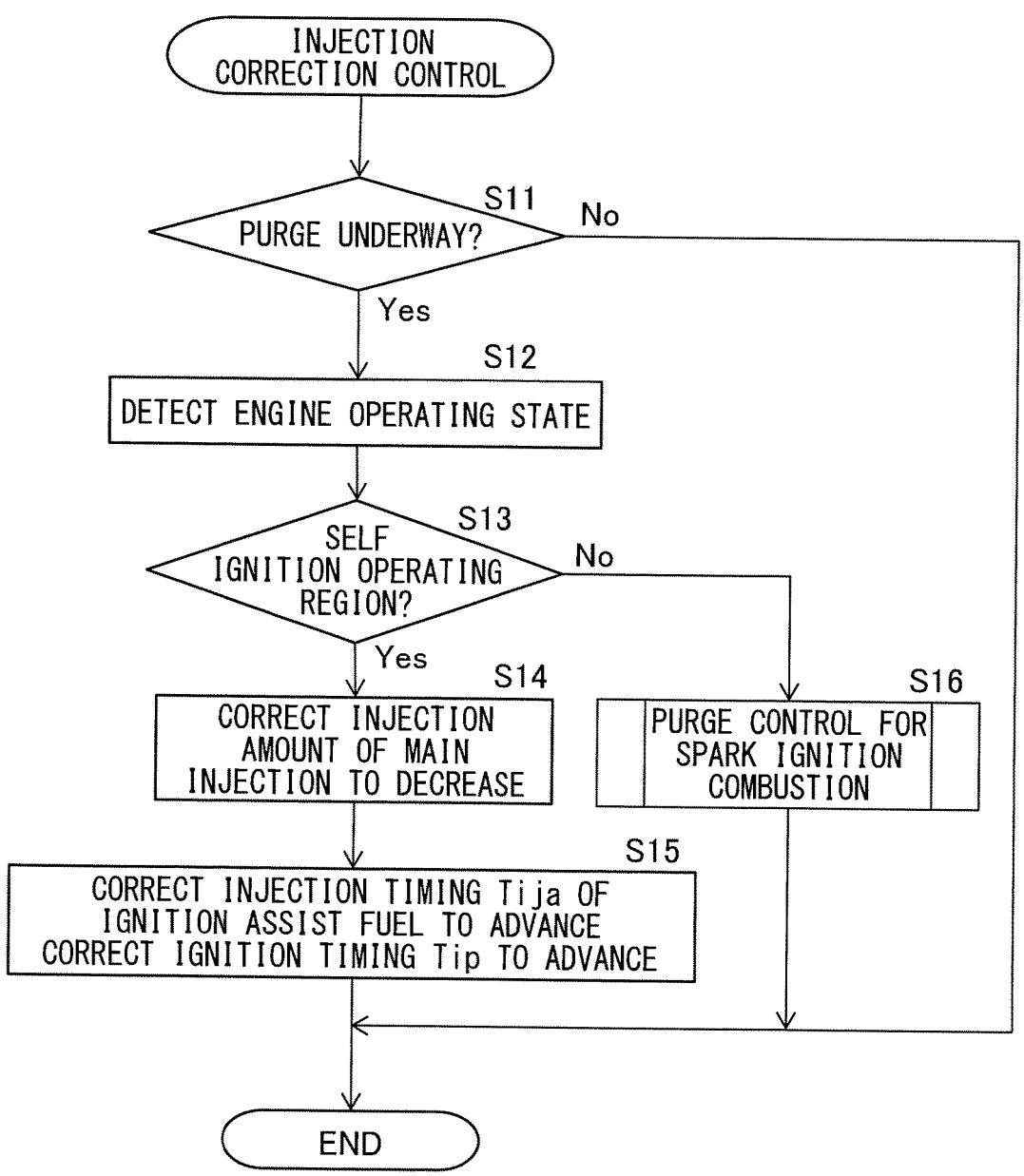
FIG. 10 is a flow chart of injection correction control for correcting an injection amount, injection timing, etc., in the present embodiment.

FIG. 10 is a flow chart of injection correction control for correcting the injection amount, injection timing, etc., in the present embodiment. The illustrated control routine is performed by constant time intervals at the basic operation amount calculating part A2.

First, at step S11, it is judged if the current state is in the middle of the purge control. Whether in the middle of purge control or not is judged based on, for example, the instruction value from the ECU 71 to the on-off valve 93. When the on-off valve 93 is closed by the ECU 71, it is judged that purge control is not being performed. In this case, the control routine is ended. On the other hand, when the on-off valve 93 is opened by the ECU 71, it is judged that purge control is being performed. In this case, the control routine proceeds to step S12.

At step S12, the engine operating state, including the engine load LD and engine speed NE, is detected. Specifically, the engine load LD calculated based on the output of the load sensor 88 and the engine speed NE calculated based on the output of the crank angle sensor 89 are detected. Next, at step S13, it is judged if the engine operating state detected at step S12 is in the self-ignition operating region RR. If at step S12 it is judged that the engine operating state is in the self-ignition operating region RR, the routine proceeds to step S14.

At step S14, the amount of injection of main fuel Qijm is corrected to decrease. In this regard, the relationship between the negative pressure in the intake passage and the decreasing correction amount at the amount of injection of main fuel Qijm is obtained in advance by calculation or experiments. This is stored as a calculation formula or map in the ROM 74 of the ECU 71. At step S14, the decreasing correction amount at the amount of injection of main fuel Qijm is calculated based on the negative pressure in the intake passage detected by the intake pressure sensor 85 using the above calculation formula or map.

Next, at step S15, the injection timing of the ignition assist fuel Tija is corrected to advance and the ignition timing Tip is corrected to advance. The advancing correction amount of the injection timing of the ignition assist fuel Tija and the advancing correction amount of the ignition timing Tip are basically the same as each other. Further, the advancing correction amount at this time is set to be larger, as the amount (ratio) of evaporated fuel supplied into a combustion chamber 15 by purge control is larger. As explained above, the amount of supply of evaporated fuel changes according to the negative pressure in the intake passage, and therefore in the present embodiment, the relationship between the negative pressure in the intake passage and the advancing correction amounts of the injection timing of the ignition assist fuel Tija and ignition timing Tip is obtained in advance by calculation or experiments, and stored as a calculation formula or map in the ROM 74 of the ECU 71. At step S15, the advancing correction amounts of the injection timing Tija and ignition timing Tip of the ignition assist fuel are calculated based on the negative pressure in the intake passage detected by the intake pressure sensor 85, using the above calculation formula or map.

Second Embodiment

Next, referring to FIGS. 11A, 11B, and 12, an internal combustion engine according to a second embodiment will be explained. The configuration and control in the internal combustion engine according to the second embodiment are basically the same as the configuration and control of the internal combustion engine according to the first embodiment. Below the parts different from the internal combustion engine according to the first embodiment will be focused on in the explanation.

Figure 11A:
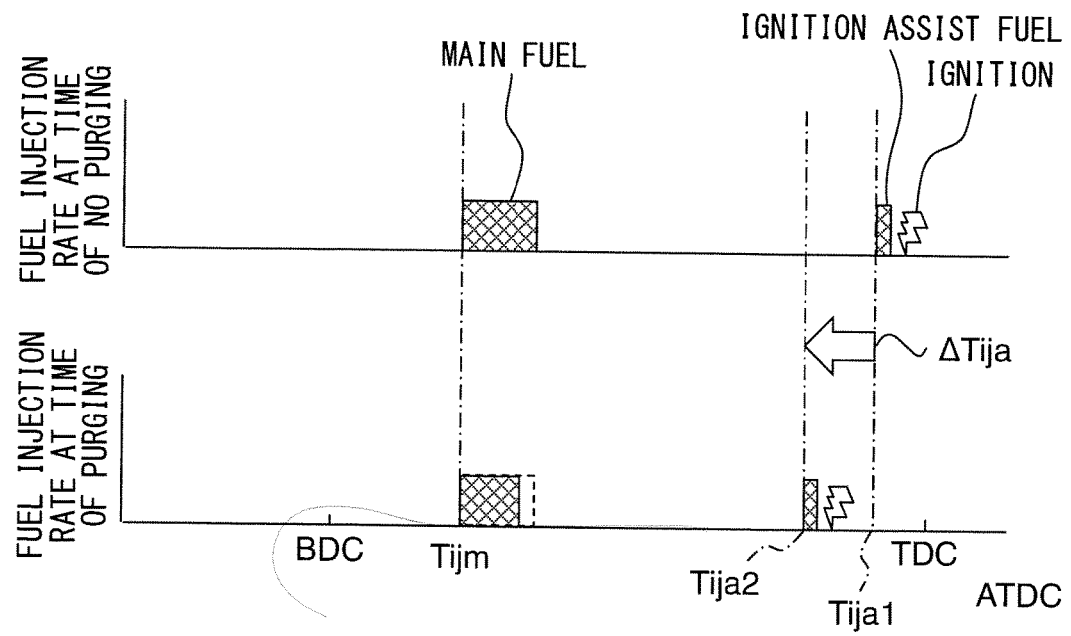
FIG. 11A is a view showing relationships between a crank angle, and fuel injection rate and ignition timing, at the time of not purging and at the time of purging.
Figure 11B:
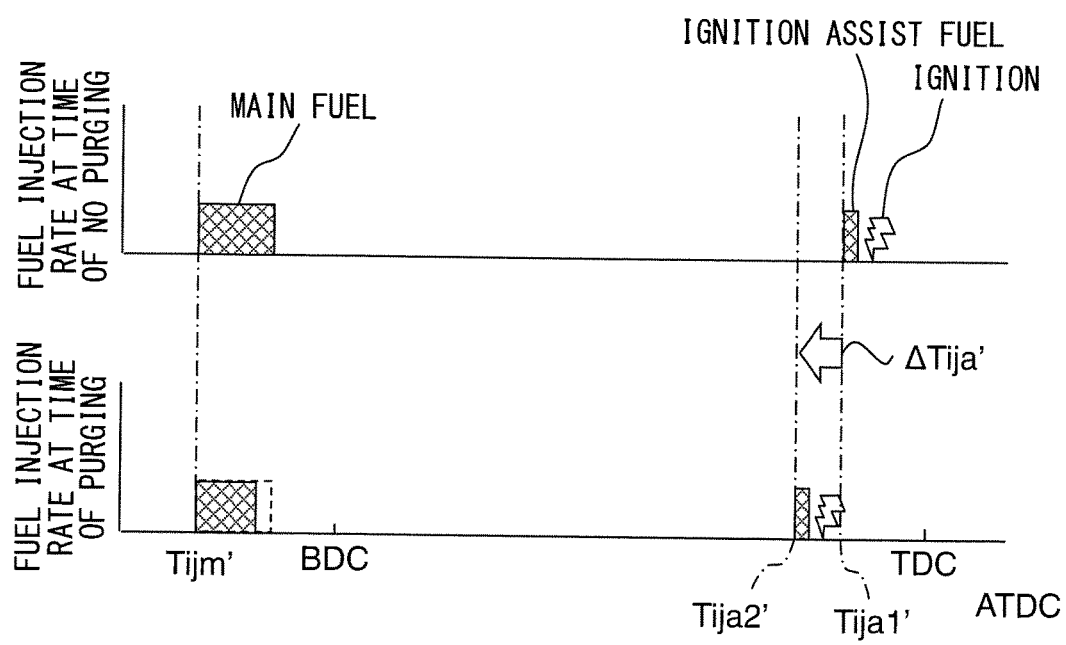
FIG. 11B is a view showing relationships between a crank angle, and fuel injection rate and ignition timing at the time of not purging and at the time of purging.
Figure 12:
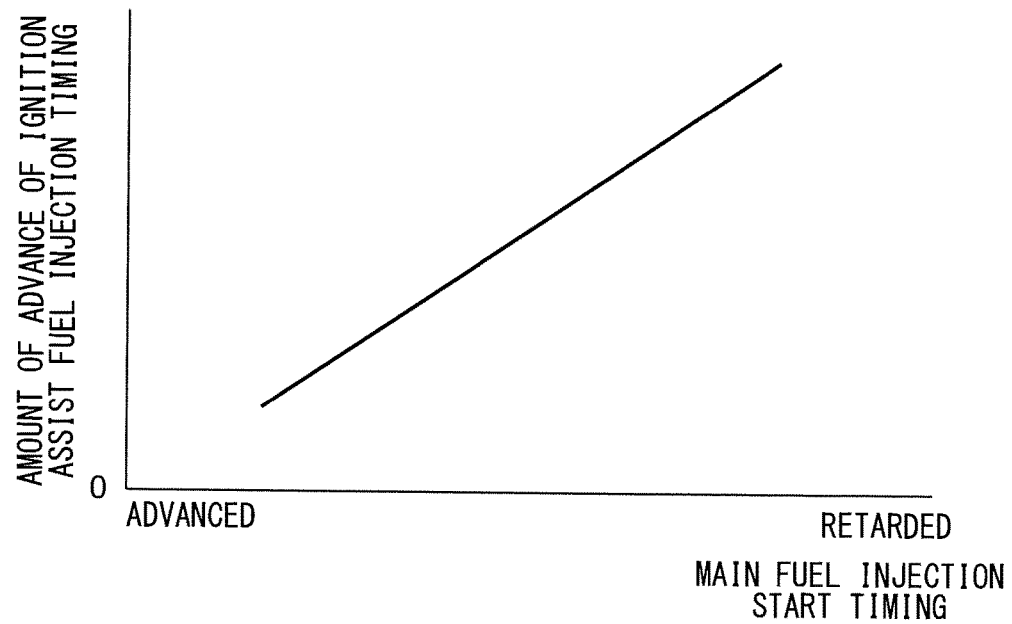
FIG. 12 is a view showing a relationship of an injection timing of main fuel and the amount of advance of an injection timing of ignition assist fuel.

FIGS. 11A and 11B are views showing the relationship among the crank angle and fuel injection rate and ignition timing when not performing purge control (time of no purging) and when performing it (time of purging). As shown in FIGS. 11A and 11B, in the present embodiment, the injection timing of the main fuel is changed in accordance with the engine operating state. Specifically, for example, the higher the engine speed NE, the more advanced the injection timing of the main fuel is.

FIG. 11A shows the case where the injection timing of the main fuel Tijm is in the middle of the compression stroke. As will be understood from FIG. 11A, in the present embodiment as well, the amount of injection of main fuel when performing purge control is smaller than the amount of injection of main fuel when not performing purge control. At this time, the amount of injection of main fuel is decreased by an amount corresponding to the amount of evaporated fuel supplied through the intake passage to a combustion chamber 15 due to purge control.

In addition, as shown in FIG. 11A, when not performing purge control, ignition assist fuel is injected at the first injection timing Tija1 near compression top dead center (TDC). On the other hand, when performing purge control, ignition assist fuel is injected at the second injection timing Tija2 at the advanced side from the first injection timing Tija1. Therefore, in the present embodiment as well, when performing purge control, compared to when not performing purge control, the injection timing of the ignition assist fuel and ignition timing due to the spark plug 16 are advanced. In particular, in the example shown in FIG. 11A, when performing purge control, compared to when not performing purge control, the injection timing of the ignition assist fuel is advanced by the first advance amount ΔTija.

On the other hand, FIG. 11B shows the case where the injection timing of the main fuel Tijm' is in the middle of the intake stroke. As will be understood from FIG. 11B, even when injecting main fuel in the middle of the intake stroke, the amount of injection of main fuel when performing purge control is smaller than the amount of injection of main fuel when not performing purge control. At this time, the amount of injection of main fuel is decreased by an amount corresponding to the amount of evaporated fuel supplied through the intake passage to a combustion chamber 15 due to purge control.

In addition, as shown in FIG. 11B, when not performing purge control, ignition assist fuel is injected at the first injection timing Tija1' near compression top dead center (TDC). On the other hand, when performing purge control, ignition assist fuel is injected at the second injection timing Tija2' at the advanced side from the first injection timing Tija1'. Therefore, even when injecting main fuel in the middle of the intake stroke, when performing purge control, compared to when not performing purge control, the injection timing of the ignition assist fuel and ignition timing due to the spark plug 16 are advanced. In particular, in the example shown in FIG. 11B, when performing purge control, compared to when not performing purge control, the injection timing of the ignition assist fuel is advanced by the second advance amount ΔTija.

Furthermore, in the present embodiment, the second advance amount ΔTija' is set to be smaller than the first advance amount ΔTija. That is, in the present embodiment, the amounts of advance when advancing the injection timing of the ignition assist fuel Tija and ignition timing due to the spark plug 16 along with purging of the evaporated fuel are set smaller when the injection timing of the main fuel is in the middle of the intake stroke, compared to when the injection timing of the main fuel is in the middle of the compression stroke. Below, this reason will be explained.

When the injection timing of the main fuel is in the middle of the compression stroke, the fuel supplied by the injection of the main fuel into a combustion chamber 15 is not necessarily uniformly dispersed before the self-ignition timing of the air-fuel mixture. Therefore, near the self-ignition timing of the air-fuel mixture, the combustion chamber 15 has a region with a relatively high equivalent ratio and a region with a relatively low equivalent ratio. The region with a relatively high equivalent ratio easily self-ignites. As a result, in such an air-fuel mixture, in the region with a relatively high equivalent ratio, the air-fuel mixture self-ignites early. Along with this, in the remaining region as well, the air-fuel mixture self-ignites. Therefore, when the injection timing of the main fuel is in the middle of the compression stroke, the air-fuel mixture self-ignites relatively easily. Further, along with this, the injection timing Tija of the ignition assist fuel and ignition timing due to the spark plug 16 are set to the relatively delayed side.

On the other hand, when the injection timing of the main fuel is in the middle of the intake stroke, the fuel supplied by the injection of the main fuel into a combustion chamber 15 disperses uniformly before the self-ignition timing of the air-fuel mixture. Therefore, near the self-ignition timing of the air-fuel mixture, the equivalent ratio of the air-fuel mixture in the combustion chamber 15 is relatively higher in uniformity everywhere in the combustion chamber 15. For this reason, similarly to when the injection timing of the main fuel is in the middle of the compression stroke, the combustion chamber 15 does not have a region where the equivalent ratio is locally high. The equivalent ratio is relatively low everywhere in the combustion chamber 15. As a result, with such an air-fuel mixture, self-ignition does not easily occur. Therefore, when the injection timing of the main fuel is in the middle of the intake stroke, the injection timing of the ignition assist fuel Tija' and ignition timing due to a spark plug 16 are set to the relatively advanced side.

On the other hand, as explained above, the evaporated fuel supplied by the purge control is mixed with the intake gas before the intake gas flows into a combustion chamber 15, and therefore near the self-ignition timing of the premix, the mixture is uniformly dispersed in the combustion chamber 15. When supplying evaporated fuel to decrease the amount of injection of main fuel by purge control, compared to when not performing purge control, the uniformity of the equivalent ratio is higher near the self-ignition timing of the premix. In particular, the uniformity of the equivalent ratio greatly changes when the injection timing of the main fuel is in the compression stroke. Therefore, when the injection timing of the main fuel is in the middle of the compression stroke, compared with when in the middle of the intake stroke, the self-ignition timing of the premix is greatly retarded along with purge control.

In this regard, in the present embodiment, as explained above, the amount of advance of the injection timing of the ignition assist fuel and ignition timing accompanied with purging of the evaporated fuel is set smaller when the injection timing of the main fuel is in the middle of the intake stroke, compared to when it is in the middle of the compression stroke. Due to this, the injection timing of the ignition assist fuel and ignition timing are advanced by the amount of delay of the self-ignition timing of the premix by performing purge control. As a result, even when performing purge control, it becomes possible to cause the premix to self-ignite at a suitable timing.

Note that, in the above embodiment, the amount of advance of the injection timing of the ignition assist fuel, etc., when performing purge control is changed between when the injection timing of the main fuel is in the middle of the compression stroke and when it is in the middle of the intake stroke. However, even when the injection timing of the main fuel is in the middle of the compression stroke, it is also possible to change the amount of advance of the injection timing of the ignition assist fuel, etc., along with the change of the injection timing of the main fuel. Similarly, even when the injection timing of the main fuel is in the middle of the intake stroke, it is possible to change the amount of advance of the injection timing of the ignition assist fuel, etc., along with change of the injection timing of the main fuel. Therefore, if expressing these all together, in the present embodiment, it can be said that the amounts of advance when advancing the injection timing of the ignition assist fuel and the ignition timing due to the spark plug 16 along with purging the evaporated fuel, are set smaller when the injection timing of the main fuel is at the relatively advanced side compared to when it is at the relatively retarded side. In this case, the relationship of the injection timing of the main fuel and the amount of advance of the injection timing of the ignition assist fuel is set as shown in FIG. 12. That is, the more to the advanced side the injection timing of the main fuel, the smaller the amount of advance of the injection timing of the ignition assist fuel is set.

Third Embodiment

Next, referring to FIG. 13, an internal combustion engine according to a third embodiment will be explained. The configuration and control in the internal combustion engine according to the third embodiment are basically the same as the configuration and control of the internal combustion engine according to the first and second embodiments. Below the parts different from the internal combustion engine according to the first and second embodiments will be focused on in the explanation.

Figure 13:
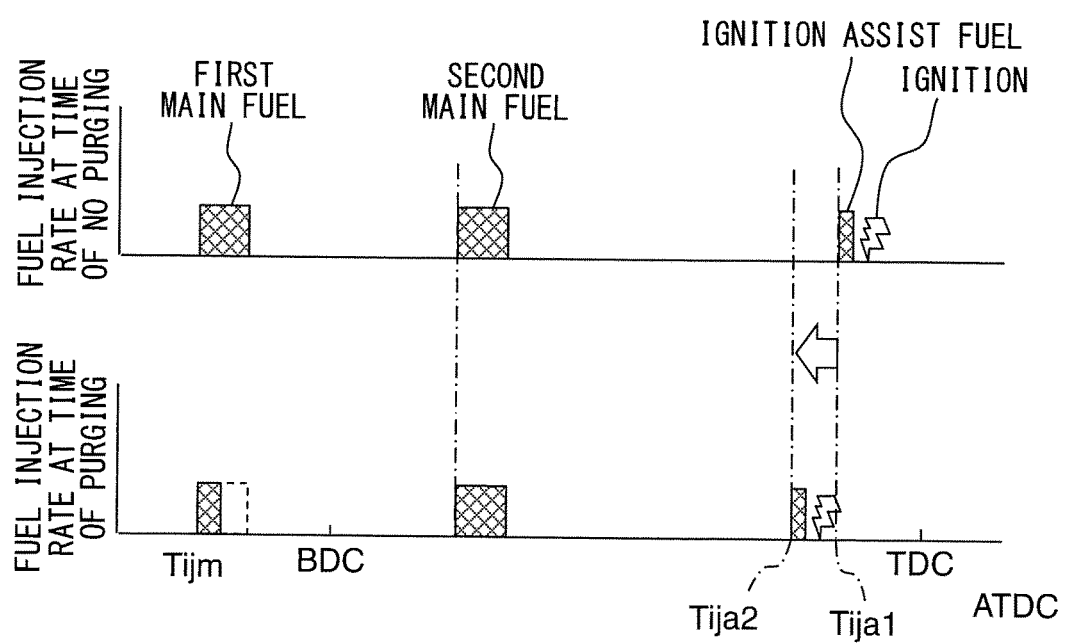
FIG. 13 is a view showing relationships between a crank angle, and fuel injection rate and ignition timing at the time of not purging and at the time of purging.

FIG. 13 is a view showing the relationship between the crank angle, and the fuel injection rate and ignition timing when not performing purge control (time of no purging) and when performing it (time of purging) in the internal combustion engine of the present embodiment. As shown in FIG. 13, in the internal combustion engine of the present embodiment, injection of the main fuel is divided into a plurality of times of injection. In particular, in the example shown in FIG. 13, the first main fuel is injected in the middle of the intake stroke and the second main fuel is injected in the middle of the compression stroke.

As shown in FIG. 13, the amount of injection of the first main fuel when performing purge control is made smaller than the amount of injection of the first main fuel when not performing purge control. At this time, the amount of injection of the first main fuel, in the same way as the internal combustion engine according to the above first embodiment, is decreased by an amount corresponding to the amount of evaporated fuel supplied through the intake passage to a combustion chamber 15 due to purge control.

On the other hand, as shown in FIG. 13, the amounts of injection of second main fuel are made the same when performing purge control and when not performing purge control. Further, as shown in FIG. 13, the injection timing of the first main fuel when performing purge control and the injection timing of the first main fuel when not performing purge control are made the same timings. Similarly, the injection timing of the second main fuel when performing purge control and the injection timing of the second main fuel when not performing purge control are made the same timings.

Further, in the present embodiment as well, the amount of injection of ignition assist fuel when performing purge control is maintained the same as the amount of injection of ignition assist fuel when not performing purge control, and accordingly these amounts are equal to each other. In addition, when performing purge control of evaporated fuel by the evaporated fuel purge device 90, compared with when not performing purge control, the injection timing of the ignition assist fuel and ignition timing due to the spark plug 16 are advanced.

According to the present embodiment, the total amounts of fuel supplied to a combustion chamber 15 when performing purge control and when not performing it, are equal to each other. For this reason, in the present embodiment as well, the engine output can be kept from fluctuating along with the start and end of purge control.

Further, according to the present embodiment, the amounts of injection of ignition assist fuel when performing purge control and when not performing it, are equal to each other. For this reason, the timing when the premix formed by the main fuel self-ignites is kept from deviating between when performing purge control and when not performing it.

In addition, according to the present embodiment, in reducing the injection amount of main fuel, only the injection amount of the first main fuel injected at an advanced side timing is decreased. As explained above, the fuel injected by the fuel injection at the advanced side timing is dispersed relatively uniformly in a combustion chamber 15. Therefore, by cancelling out the amount of increase of the evaporated fuel by the purge control by the decrease of the amount of injection of the first main fuel, it is possible to keep small the deviation of the self-ignition timing of the premix.

Note that, in the above embodiment, the injection of the main fuel is divided into the two times of injection of the first main fuel and the second main fuel, but the injection of the main fuel may also be divided into three times of injection or more. Further, in the above embodiment, the first main fuel may be injected in the middle of the intake stroke and the second main fuel may be injected in the middle of the compression stroke. However, the plurality of times of injection of main fuel may be performed at any timings so long as in the middle of the intake stroke and the middle of the compression stroke. Therefore, for example, the injection of the first main fuel and the injection of the second main fuel may both be performed in the middle of the intake stroke or may both be performed in the middle of the compression stroke.

In such a case as well, when performing purge control, compared with when not performing purge control, the injection amounts in part of the injections among the plurality of times of injection of main fuel are decreased. Further, when performing purge control, compared with when not performing purge control, it is preferable that the injection amount in the injection at the most advanced side timing among the plurality of times of injection of main fuel (in the example shown in FIG. 13, the injection of the first main fuel) is decreased.

Fourth Embodiment

Next, referring to FIGS. 14A and 14B, an internal combustion engine according to a fourth embodiment will be explained. The configuration and control in the internal combustion engine according to the third embodiment are basically the same as the configuration and control of the internal combustion engine according to the first embodiment to the third embodiment. Below the parts different from the internal combustion engine according to the first embodiment to the third embodiment will be focused on in the explanation.

Figure 14A:
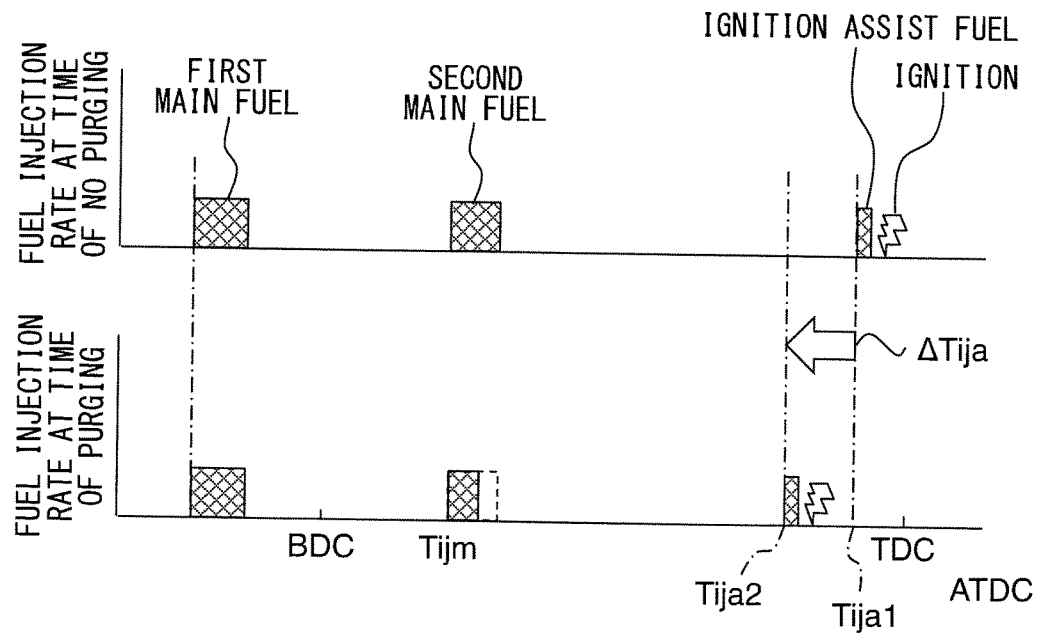
FIG. 14A is a view showing relationships between a crank angle, and fuel injection rate and ignition timing at the time of not purging and at the time of purging.
Figure 14B:
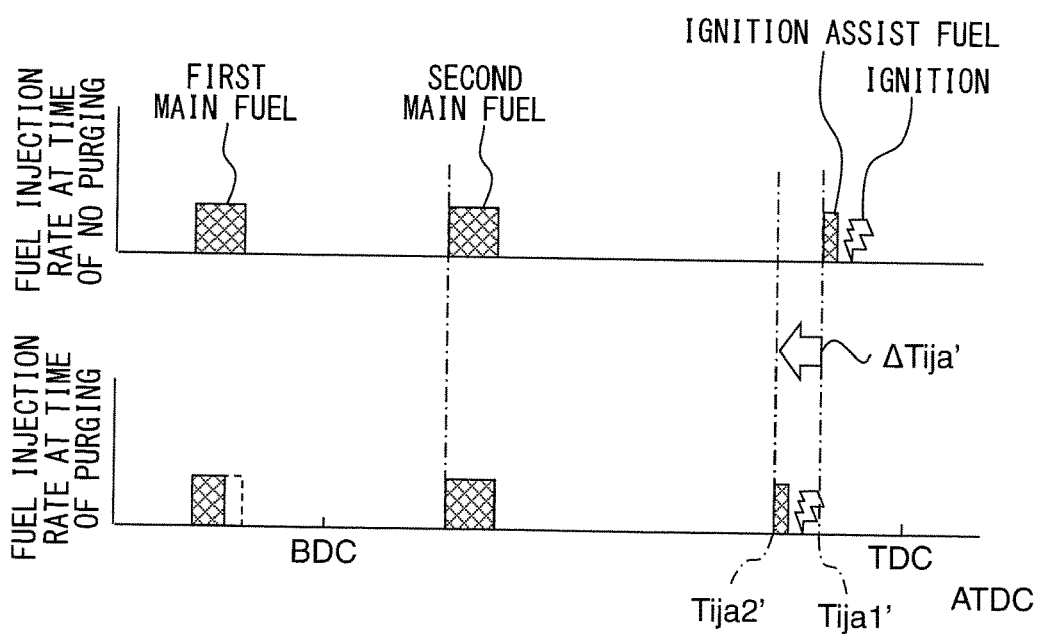
FIG. 14B is a view showing relationships between a crank angle, and fuel injection rate and ignition timing at the time of not purging and at the time of purging.

FIGS. 14A and 14B are views showing relationships of the crank angle, and fuel injection rate and ignition timing when not performing purge control (time of no purging) and when performing it (time of purging). As shown in FIGS. 14A and 14B, in the internal combustion engine of the present embodiment, the injection of the main fuel is divided into a plurality of times of injections. In the example shown in FIGS. 14A and 14B, the first main fuel is injected in the middle of the intake stroke while the second main fuel is injected in the middle of the compression stroke. In addition, as shown in FIGS. 14A and 14B, in the present embodiment, the main fuel where the amount of injection has been decreased along with purge control, is changed in accordance with the engine operating state.

In the example shown in FIG. 14A, the amount of injection of the second main fuel when performing purge control is smaller than the amount of injection of the second main fuel when not performing purge control. At this time, the amount of injection of second main fuel, like the internal combustion engine according to the first embodiment, is decreased by an amount corresponding to the amount of evaporated fuel supplied through the intake passage to a combustion chamber 15 due to purge control.

On the other hand, in the example shown in FIG. 14A, the amount of injection of the first main fuel is the same between when performing purge control and when not performing purge control. Further, as shown in FIG. 14A, the injection timings of the first main fuel and the second main fuel when performing purge control are the same timings as when not performing purge control.

In addition, in the example shown in FIG. 14A, when not performing purge control, the ignition assist fuel is injected at the first injection timing Tija1 near compression top dead center (TDC). On the other hand, when performing purge control, the ignition assist fuel is injected at the second injection timing Tija2 at the advanced side from the first injection timing Tija1. Therefore, in the present embodiment as well, the injection timing of the ignition assist fuel and ignition timing due to the spark plug 16 are advanced when performing purge control, compared with when not performing purge control. In particular, in the example shown in FIG. 14A, the injection timing of the ignition assist fuel is advanced by a third advance amount ΔTija when performing purge control, compared with when not performing purge control.

On the other hand, in the example shown in FIG. 14B, the injection amount of the first main fuel when performing purge control is smaller than the injection amount of the first main fuel when not performing purge control. At this time, the amount of injection of the first main fuel, in the same way as the internal combustion engine according to the first embodiment, is decreased by an amount corresponding to the amount of evaporated fuel supplied through the intake passage to a combustion chamber 15 due to purge control.

On the other hand, in the example shown in FIG. 14B, the amounts of injection of the second main fuel are the same between when performing purge control and when not performing purge control. Further, as shown in FIG. 14B, the injection timings of the first main fuel and the second main fuel when performing purge control are the same timings as when not performing purge control.

In addition, in the example shown in FIG. 14B, when purge control is not being performed, ignition assist fuel is injected at the first injection timing Tija1' near compression top dead center (TDC). On the other hand, when performing purge control, ignition assist fuel is injected at the second injection timing Tija2' at the advanced side from the first injection timing Tija1'. Therefore, even when reducing the amount of injection of the first main fuel along with performing purge control, when performing purge control, compared to when not performing purge control, the injection timing of the ignition assist fuel and ignition timing due to the spark plug 16 are advanced. In particular, in the example shown in FIG. 14B, when performing purge control, compared with when not performing purge control, the injection timing of the ignition assist fuel is advanced by a fourth advance amount ΔTija'.

Furthermore, in the present embodiment, the fourth advance amount ΔTija' is set so as to be smaller than the third advance amount ΔTija. That is, in the present embodiment, the amounts of advance when advancing the injection timing of the ignition assist fuel Tija and ignition timing due to the spark plug 16 along with the purging of the evaporated fuel are set smaller when the injection timing at part of the injections where the injection amount is decreased along with purging of evaporated fuel among the plurality of times of injection of main fuel, is in the middle of the intake stroke, compared to when it is in the middle of the compression stroke.

The reason why the fourth advance amount ΔTija' is set to be smaller than the third advance amount ΔTija in this way, as explained above, is that the self-ignition timing of the premix is greatly retarded along with performance of purge control when the injection timing of the main fuel is in the middle of the compression stroke, compared to when it is in the middle of the intake stroke. By making the fourth advance amount ΔTija' smaller than the third advance amount ΔTija, it is possible to make the premix self-ignite at a suitable timing even when performing purge control.

Note that, in the above embodiment, the injection of the main fuel is divided into two injections of the first main fuel and the second main fuel, but the injection of the main fuel may also be divided into three times or more. Further, in the above embodiment, the first main fuel is injected during the intake stroke while the second main fuel is injected during the compression stroke. However, a plurality of times of main fuel injection may be performed at any timings so long as during the intake stroke and during the compression stroke.

However, in the present embodiment, the amounts of advance when advancing the injection timing of the ignition assist fuel and ignition timing due to the spark plug 16 along with purging of evaporated fuel are set smaller when the injection timings of part of the injections at which the injection amount is decreased along with purging of evaporated fuel among the plurality of times of main fuel are at the relatively advanced side, compared to when they are the relatively retarded side.

REFERENCE SIGNS LIST 1. internal combustion engine
10. engine body
15. combustion chamber
31. fuel injector
71. electronic control unit (ECU)
90. evaporated fuel purge device

The invention claimed is:

1. An internal combustion engine comprising: a fuel injector directly injecting fuel into a combustion chamber; a spark plug igniting an air-fuel mixture in the combustion chamber; an evaporated fuel purge device purging evaporated fuel in a fuel tank into an intake passage of the internal combustion engine; and a control device for controlling said fuel injector, said spark plug, and said evaporated fuel purge device, wherein said control device is configured to perform spark assist control for sequentially injecting premix-forming fuel and injecting ignition assist fuel from said fuel injector while controlling an injection amount and injection timing of said premix-forming fuel and said ignition assist fuel and ignition timing by said spark plug so as to make an air-fuel mixture formed by said injection of ignition assist fuel burn by said spark plug by flame propagation and to make the remaining fuel burn by premixed compression self-ignition by using the heat released by said flame propagation combustion, and said control device is configured to decrease said injection amount of premix-forming fuel without changing the injection amount of ignition assist fuel when purging evaporated fuel into said intake passage by said evaporated fuel purge device, compared to when not purging it.

2. The internal combustion engine according to claim 1, wherein said control device is configured to advance the injection timing of the ignition assist fuel and the ignition timing by said spark plug, when purging evaporated fuel into said intake passage by said evaporated fuel purge device, compared to when not purging it.

3. The internal combustion engine according to claim 2, wherein said control device is configured to set the amounts of advance when advancing the injection timing of the ignition assist fuel and the ignition timing by the spark plug along with purging of said evaporated fuel, smaller when the injection timing of said premix-forming fuel is at the relatively advanced side, compared to when it is at the relatively retarded side.

4. The internal combustion engine according to claim 2, wherein said control device is configured to inject said premix-forming fuel in a plurality of times of injection and reduces the injection amounts of part of the injections among said plurality of times of injection of premix-forming fuel when purging evaporated fuel into said intake passage by said evaporated fuel purge device, compared to when not purging it.

5. The internal combustion engine according to claim 4, wherein said control device is configured to reduce the injection amount at the injection of only the most advanced side timing among said plurality of times of injection of premix-forming fuel when purging evaporated fuel into said intake passage by said evaporated fuel purge device, compared to when not purging it.

6. The internal combustion engine according to claim 4, wherein said control device is configured to set the amounts of advance when advancing the injection timing of the ignition assist fuel and the ignition timing by said spark plug along with purging of said evaporated fuel, smaller when an injection timing at part of the injections where the amount of injection is reduced along with purging of said evaporated fuel among said plurality of times of injection of premix-forming fuel is at the relatively advanced side, compared to when at the relatively retarded side.

7. The internal combustion engine according to claim 5, wherein said control device is configured to set the amounts of advance when advancing the injection timing of the ignition assist fuel and the ignition timing by said spark plug along with purging of said evaporated fuel, smaller when an injection timing at part of the injections where the amount of injection is reduced along with purging of said evaporated fuel among said plurality of times of injection of premix-forming fuel is at the relatively advanced side, compared to when at the relatively retarded side.

* * * * *